(12) United States Patent
Takatori

(10) Patent No.: US 8,958,044 B2
(45) Date of Patent: Feb. 17, 2015

(54) NON-RECTANGULAR PIXEL ARRAY AND DISPLAY DEVICE HAVING SAME

(71) Applicant: NLT Technologies, Ltd., Kanagawa (JP)

(72) Inventor: Kenichi Takatori, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 0 days.

(21) Appl. No.: 13/905,800

(22) Filed: May 30, 2013

(65) Prior Publication Data

US 2013/0264957 A1  Oct. 10, 2013

Related U.S. Application Data

(60) Continuation of application No. 13/422,727, filed on Mar. 16, 2012, now Pat. No. 8,525,966, which is a division of application No. 12/463,712, filed on May 11, 2009, now Pat. No. 8,159,644.

(30) Foreign Application Priority Data

May 11, 2008 (JP) .................................. 2008-124113
May 11, 2009 (JP) .................................. 2009-114790

(51) Int. Cl.
*G02F 1/1343* (2006.01)
*H05B 37/00* (2006.01)
(Continued)

(52) U.S. Cl.
CPC .......... *H05B 37/00* (2013.01); *G02F 1/134336* (2013.01); *G02F 1/13452* (2013.01);
(Continued)

(58) Field of Classification Search
USPC ....................................................... 349/146
See application file for complete search history.

(56) References Cited

U.S. PATENT DOCUMENTS 5,311,337 A   5/1994  McCartney
6,067,143 A *  5/2000  Tomita ........................ 349/143
(Continued)

FOREIGN PATENT DOCUMENTS

JP  61-123869 A  6/1986
JP     6373291 A  4/1988
(Continued)

OTHER PUBLICATIONS

Communication dated Jan. 29, 2013 from the Japanese Patent Office in counterpart Japanese application No. 2009-114790.
(Continued)

*Primary Examiner* — Michelle R Connelly
(74) *Attorney, Agent, or Firm* — Sughre Mion, PLLC

(57) ABSTRACT

A non-rectangular pixel array includes non-rectangular pixels. A first conductor line group including first conductor lines and a second conductor line group including second conductor lines are arranged to intersect. Each non-rectangular pixel is arranged to be partially surrounded by one of the first conductor lines and one of second conductor lines. Each first conductor lines includes a first line and a second line which are arranged in parallel and in proximity to each other, without non-rectangular pixel existing between the first line and the second line within each first conductor line, and with non-rectangular pixels existing between adjacent the first conductor lines. Non-rectangular pixels include first pixels and second pixels. Each first pixel is arranged to be partially surrounded by the first line and the second conductor line, and each second pixel is arranged to be partially surrounded by the second line and the second conductor line.

40 Claims, 27 Drawing Sheets

(51) Int. Cl.
  *G02F 1/1345* (2006.01)
  *G06F 3/14* (2006.01)
  *G09G 3/20* (2006.01)
  *G09G 5/00* (2006.01)

(52) U.S. Cl.
  CPC . *G06F 3/14* (2013.01); *G09G 3/20* (2013.01); *G09G 5/00* (2013.01); *G09G 2300/0439* (2013.01); *G09G 2300/0842* (2013.01); *G09G 2320/02* (2013.01); *G09G 2340/0457* (2013.01)
  USPC .......................................................... 349/146

(56) References Cited

U.S. PATENT DOCUMENTS

| | | | |
|---|---|---|---|
| 7,253,865 B2 * | 8/2007 | Battersby | 349/146 |
| 2005/0099378 A1 | 5/2005 | Kim | |
| 2006/0209243 A1 | 9/2006 | Chen et al. | |
| 2007/0070093 A1 | 3/2007 | Lin et al. | |
| 2007/0279327 A1 | 12/2007 | Yim et al. | |
| 2008/0088568 A1 * | 4/2008 | Haga et al. | 345/100 |

FOREIGN PATENT DOCUMENTS

| | | | |
|---|---|---|---|
| JP | 2135425 A | | 5/1990 |
| JP | 05-210110 A | | 8/1993 |
| JP | 06-186575 A | | 7/1994 |
| JP | 2572702 B2 | | 10/1996 |
| JP | 09-230303 A | | 9/1997 |
| JP | 2001-204039 A | | 7/2001 |
| JP | 2002-221730 A | | 8/2002 |
| JP | 2002221730 A | * | 8/2002 |
| JP | 2004-212498 A | | 7/2004 |
| JP | 2004-212500 A | | 7/2004 |
| JP | 2005-528644 A | | 9/2005 |
| JP | 2005-529368 A | | 9/2005 |
| JP | 2006-276359 A | | 10/2006 |
| JP | 2007249178 A | | 9/2007 |
| JP | 2007-272203 A | | 10/2007 |
| JP | 2008-046598 A | | 2/2008 |
| WO | 03/102905 A1 | | 12/2003 |
| WO | 03/105116 A1 | | 12/2003 |
| WO | 2007069187 A2 | | 6/2007 |

OTHER PUBLICATIONS

Japanese Office Action dated Sep. 3, 2013, issued in corresponding Japanese Patent Application No. 2009-114790.
Communication dated Sep. 24, 2014, issued by the Japanese Patent Office in related Japanese application No. 2013-229778.
Communication dated Oct. 10, 2014, issued by the State Intellectual Property Office of P.R. China in counterpart Chinese application No. 201210322346.4.

* cited by examiner

- 16; Gate Line
- 17; Data Line
- 7c; Parallelogrammic Pixel
- 18; Storage Capacitance Line
- 15c; Active Element

- SC; Storage Capacitance Line
- GA, GB; Gate Lines
- 7d; Triangular Pixel
- 7e; Triangular Pixel
- 15d
- DL; Data Line

NON-RECTANGULAR PIXEL ARRAY AND DISPLAY DEVICE HAVING SAME

CROSS-REFERENCE TO RELATED APPLICATIONS

This application is a Continuation of U.S. patent application Ser. No. 13/422,727 filed Mar. 16, 2012, which is a Divisional of U.S. patent application Ser. No. 12/463,712, now U.S. Pat. No. 8,159,644, filed May 11, 2009, which claims priority from Japanese Patent Application No. 2008-124113, filed May 11, 2008, and Japanese Patent Application No. 2009-114790, filed May 11, 2009, the disclosures of which are incorporated herein in its entireties by reference.

BACKGROUND OF THE INVENTION

1. Field of the Invention

The present invention relates to a non-rectangular pixel array and a non-rectangular display device made up of the pixel array and more particularly to the pixel array having a non-rectangular outer circumferential shape and the non-rectangular display device made up of the pixel array with outer circumferential portion of which has a shape of a smoothly curved line.

2. Description of the Related Art

In recent years, due to extension of applications associated with progress of miniaturization, thinning, light-weighting of a display device, demands for commercialization of such a display device made up of a pixel array (hereinafter, may be referred to as a display area) having a non-rectangular outer shape are increasing. Display devices of this kind are disclosed, for example, in Patent References 1 and 2 (Japanese Patent Application Publication Nos. 2005-528644 and 2005-529368, respectively). FIG. 45 shows configurations of the display device stated in the Patent Reference 1. The display device, as shown in FIG. 45, is mainly made up of a pixel array 40 having a non-rectangular outer shape, row driver circuits 41, 41, ... divided into at least three portions, and column driver circuits 42, 42, ... divided into at least three portions. The row driver circuits 41, 41, ... and the column driver circuits 42, 42, ... are alternately arranged along the circumference of the pixel array 40, and each pixel is addressed by the row driver circuits 41, 41, ... and column driver circuits 42, 42, ... each connected to a corresponding row conductor line and a corresponding column conductor line. By configuring as above, control for display/non-display even on the pixel array 40 forming a complicated outer shape can be exerted. However, in the Patent Reference 1, a shape of each pixel making up the pixel array is not described clearly. In the display device shown in the Patent Reference 1, as shown in FIG. 45, the row conductor line and column conductor line are alternately arranged in an orthogonal manner and, therefore, it is natural to assume that each pixel has a rectangular shape. (though a pixel electrode itself is not always rectangular, it is thought that, at least, a minimum pattern making up one pixel unit is rectangular).

According to the technology disclosed in the Patent Reference 1, a position of a shift point to be set on an outer circumferential portion having odd shapes of the pixel array 40, between the row driver circuit 41 and column driver circuit 42, which are adjacent to each other, is specified as follows. First, contact positions 43, 43, ... (shown as black circles in FIG. 45) on an outer circumference where a tangent line to an outer circumferential portion having an odd shape of the pixel array is parallel to the row conductor line or column conductor line, are checked and these contact positions 43, 43, ... are specified as the positions of the shift points. These contact positions 43, 43, ... exist on an extruded portion on the outer circumference or at the most backward portion of a convex portion on the outer circumference. Next, if positions on the outer circumference positioned opposite, along the row line or column line, to these contact positions 43, 43, ... are not specified yet as set positions of the shift points, these points are specified as positions 44, 44, ... (shown as white circles in FIG. 45) of the shift points. When the row driver circuits 41, 41, ... divided into a plurality of portions and the column driver circuits 42, 42, ... divided into a plurality of portions are arranged according to the specification of all shift points, in a given pixel making up the pixel array 40, one end of the row contactor line is connected to the row driver circuit 41 and another end of the column contactor line is positioned in a manner to straightly face the column driver circuit 42. Similarly, in a given pixel, one end of the corresponding column contact line is connected to the column driver circuits 42 and another end of the column contactor line is positioned in a manner to face straightly the column driver circuit 42. Moreover, the display device is so configured that a carry signal is transmitted to a next column driver circuit 42 at an end of the divided column driver 42.

FIG. 46 shows a display device disclosed in the Patent Reference 2. The display device, as shown in FIG. 46, is made up of an octagonal pixel array 48 having a plurality of pixels 47, 47, ... in which row pixels 45, 45, ... intersecting at right angles and column pixels 46, 46, ... are arranged. The row driver circuits 52 and column driver circuits 53, as shown in FIG. 46, are mounted at a highest corner on an outer circumference of the octagonal pixel array 48. Each of the pixels 47, 47, ... making up the pixel array 48, as shown in FIG. 46, has a rectangular shape and is associated, in a one-to-one relationship, with each of intersections 51, 51, ... of the first address designating conductors 49, 49, ... and the second address designating conductors 50, 50, ... making up a lattice, as a whole, and is uniquely addressed by one pair of the first address designating conductors 49 and second address designating conductors 50.

In display device, as shown in FIG. 46, the first address designating conductors 49, 49, ... and the second address designating conductors 50, 50, ... are arranged slantingly relative to the row and column of the rectangular pixels 47, 47, ... and in a manner to be intersected diagonally with one another. By configuring as above, the row and column of the rectangular pixels 47, 47, ... can be separated from the first address designating conductors 49, 49, ... and the second address designating conductors 50, 50, ... which enables freedom of position setting of the drive circuits to be obtained. Owing to the freedom, space can be saved so that conditions for product designing are satisfied. For example, as shown in FIG. 46, side space required on each side of a display area (pixel array 48) can be reduced, which enables a display area occupying region to be sufficiently increased and good centering to be achieved.

In the non-rectangular display device, it is desirous that the circumferential contour of the display area (pixel array) has a smooth and gentle shape (for example, closed curve). However, as described above, the conventional display devices stated in the Patent References 1 and 2 have disadvantages that, though the display area (pixel arrays 40 and 48) is non-rectangular, each rectangular pixel 47 making up the display area is rectangular and, therefore, a region occurs in which no matching between the rectangular pixel 47 and non-rectangular outer circumferential contour is realized. That is, in the configurations of the conventional display device, as shown in FIGS. 47 and 48, in the curved region (or slanted region) 54 out of the outer circumferential portions, a plurality of pixels 47, 47, . . . is arranged in a stepwise manner and, as a result, the display area having a smooth and gentle contour shape cannot be obtained, which gives uncomfortable jaggies to viewers, causing a loss of attractive appearance and unfavorable designing.

Also, the display devices disclosed in the Patent References 1 and 2 have another problem in that, when a given slant line or curved pattern including an outer circumferential contour of a shape is to be displayed, more specifically, an equal distance line pattern (due to mimicking of a contour line on a map, such a pattern is referenced to as a contour line like shape or figure) obtained by performing linking between positions, by a specific equal distance, far from a pattern similar to an outer circumference of a display area or from an outer circumferential contour or the like is to be displayed, since a plurality of rectangular pixels is selected and controlled in a stepwise manner, as shown in FIG. 48, a slant figure or curved FIG. 55*a* is visually recognized by a viewer as the pattern having uncomfortable jaggies and distortion, which is not preferable in terms of display quality.

In addition, the color display device having the rectangular display area (in the example, display area having the same as in FIG. 48) shown in FIG. 49 also has a problem in that a region occurs in which a specified color only is enhanced in an outer circumferential curved portion of a display area or in an outer shape line portion of a display pattern, which is recognized as irregular color or a like. In the color display device, each pixel 57, as shown in FIG. 49, is made up of three kinds of color pixels (color segment) including a rectangular red pixel (red segment) 57*r* having a red color filter, a rectangular green pixel (green segment) 57*g* having a green color filter, and a rectangular blue pixel (blue segment) 57*b* having a blue color filter, and is configured to form a rectangular pixel unit. The color pixels of three kinds are formed in a stripe form, as a whole.

In the color display device, when a contour line like shape 55 being similar to an outer circumferential contour of a display area is displayed in white with the priority being given to its shape, as shown in FIG. 49, the pixel region appears in which only the green pixel 57*g* and blue pixel 57*b* are displayed and no red pixel is displayed (regions indicated by circular marks in FIG. 49). In the pixel region corresponding to an outer shape curved portion of a display pattern, no white is observed sporadically and cyan (jagged color spreading) obtained by mixing blue and green is observed, which is not preferable in terms of display quality. In order to solve this problem, white is displayed by necessarily using the red pixel 57*r*, green pixel 57*g*, and blue pixel 57*b* making up the pixel 57 (that is, with the priority given to a hue). However, a problem arises that, by displaying in white with the priority given to a hue, irregular colors disappear, while a corner occurs in three color pixels and jaggies increase in the display area and display pattern which, in this case, are uncomfortable.

In addition, another problem arises that, the display device having an extremely odd shape in which a hollow portion or through hole exists in the display area, out of the non-rectangular display devices, can not be realized by configurations disclosed in the Patent References 1 and 2.

Further, the display device stated in the Patent Reference 2 also has a disadvantage in that, as shown in FIG. 46, each of the first address designating conductors 49, 49, . . . and each of the second address designating conductors 50, 50, . . . pass slantingly through an aperture of each of the rectangular pixels 47, 47, . . . resulting in partial blocking of the aperture, thus causing a decrease in an aperture rate. The display device still further has a disadvantage that the positions in which the first address designating conductors 49, 49, . . . and second address designating conductors 50, 50, . . . intersect with each other in the rectangular pixels 47, 47, . . . differ for every rectangular pixel 47 and, as a result, an arrangement of the switching elements mounted in a one to one relationship at the intersection region or its vicinity area differ for every rectangular pixel 47, which makes designing of the display device be extremely difficult. As is described above, the arrangement of the switching elements is not equal and, therefore, the places where a failure or the like occurs are different, which makes the inspection to be complicated and makes it difficult to manufacture the display device having an equal quality.

The display device stated in the Patent Reference 2 has another disadvantage that the rectangular pixels 47, 47, . . . , first address designating conductors 49, 49, . . . , and second address designating conductors 50, 50, . . . arranged in directions being different from one another at pitches different from one another and, therefore, a moiré (coarse interference fringe) of this kind occurring structurally appears principally by overlapping of a design changing regularly and the moiré cannot be deleted by a simple means which is troublesome. By adjusting the shape of the rectangular pixels 47, 47, . . . , and the angle at which first address designating conductors 49, 49, . . . and second address designating conductors 50, 50, . . . intersect with one another, this kind of moiré can be reduced, however, the angle adjustment causes a decrease in an aperture ratio and the angle adjustment is accompanied by large designing constraints, for example, designing problems that the arrangement position of peripheral circuits interfere with the shape of the display area.

In the display device disclosed in the Patent Reference 2, it is possible to perform a conformal mapping method on the rectangular pixel array, thus obtaining a non-rectangular pixel array in which jaggies can be reduced. However, this display device has a disadvantage that regularity of each pixel is decreased and a symmetric property is degraded, which causes lowered viewability of a displayed pattern, in particular, of characters. In the pixel array obtained by the conformal mapping method, no repetition of a minimum pattern occurs in many cases and manual designing of each pixel based on calculated coordinates is required, causing extremely complicated work to be unavoidable. Moreover, even after the completion of designing, there are little simple repeated patterns, which extremely increases data amounts and work and the number of man-hours in mask processing thereafter, which is not preferable in terms of actual usability.

Further, in the non-rectangular display device disclosed in the Patent References 1 and 2, it is not assumed that a potential or signal is supplied to a corresponding electrode of each pixel and third conductor line group used to change the supplied potential or signal is mounted. If the third conductor line group is added to the configuration stated in the Patent Reference 1, due to a small space region in the vicinity of the outer circumferential portion of the pixel array 40, it is necessary that a third driver circuit is mounted outside two kinds of driver circuits 41 and 42 already mounted, thus increasing a ratio of a peripheral circuit region to the pixel array 40, which is not preferable to achieve a non-rectangular display device attaching importance to a design result. In addition, many intersection regions occur among conductor lines to be connected to the driver circuits 41 and 42, driver circuits 41 and 42, third conductor line, which causes a disadvantage that cross capacitance generated by overlapping of conductor lines and parasitic capacitance generated by approach between a conductor line or driver circuit and another conductor increase. In order to suppress an influence exerted on the increased parasitic capacitance, it is assumed that load capacitance may occur in the driving circuit, however, this method is accompanied by an increase in a circuit area. Moreover, the driver circuit and conductor lines are arranged in a complicated manner and, therefore, the fear of the occurrence of a short circuit between the conductor line and circuit arises, which reduces a production yield and reliability.

In the configuration stated in the Patent Reference 2, it is possible that the third peripheral circuit (not shown) can be easily mounted in a place where the driver circuits 41 and 42 do not overlap and, for example, may be mounted on a lower side of the display area in FIG. 46. However, in the configuration stated in the Reference 2, as described above, the position where the row conductor line and column conductor line intersect with each other differs for every pixel, thus possibly causing further difficult designing and increase in the occurrence of moiré.

Moreover, in Patent Reference 3 (Japanese Patent Application Laid-open No. 2004-212498), Patent Reference 4 (Japanese Patent Application Laid-open No. 2004-212500), and Patent Reference 5 (Japanese Patent Application Laid-open No. 2006-276359), technologies for the non-rectangular display device are described, however, no description of each problem of the above-described conventional technologies and technological method to solve the above problems is provided.

SUMMARY OF THE INVENTION

In view of the above, it is an object of the present invention to provide an oddly shaped (rectangular) pixel array and a display device having a smooth and gentle outer circumferential shape without sacrificing brightness, viewability, and fidelity of an image.

According to a first aspect of the present invention, there is provided a pixel array with a non-rectangular shaped outer circumference including a plurality of non-rectangular pixels wherein at least a first conductor line group made up of a plurality of first conductor lines and a second conductor line group made up of a plurality of second conductor lines are arranged so as to intersect with each other and each of the non-rectangular pixels is arranged so as to be entirely or partially surrounded by each of the first conductor lines and the second conductor lines.

According to a second aspect of the present invention, there is provided a non-rectangular pixel array including a non-display portion with no pixels and with a non-rectangular contour shape formed inside of the non-rectangular pixel array and a plurality of non-rectangular pixels are so arranged that at least a first conductor line group made up of a plurality of first conductor lines and a second conductor line group made up of a plurality of second conductor lines intersect with each other and are so arranged as to be entirely or partially surrounded by the first and second conductor lines.

According to a third aspect of the present invention, there is provided a pixel array with a non-rectangular shaped outer circumference including a plurality of non-rectangular pixels wherein at least a first conductor line group made up of a plurality of first conductor lines, a second conductor line group made up of a plurality of second conductor lines, and a third virtual line group made up of a plurality of third virtual lines are arranged so as to intersect with one another and each of the non-rectangular pixels is arranged so as to be entirely or partially surrounded by each of the first conductor lines, the second conductor lines, and the virtual lines.

According to a fourth aspect of the present invention, there is provided a non-rectangular pixel array including a non-display portion with no pixels and with a non-rectangular contour shape formed inside of the non-rectangular pixel array and a plurality of non-rectangular pixels is so arranged that a first conductor line group made up of a plurality of first conductor lines, a second conductor line group made up of a plurality of second conductor lines, and a third virtual line group made up of a plurality of third virtual lines intersect with one another and so arranged as to be surrounded by the first conductor lines, the second conductor lines, and the third virtual lines.

According to a fifth aspect of the present invention, there is provided a pixel array with a non-rectangular shaped outer circumference including a plurality of non-rectangular pixels wherein a first conductor line group made up of a plurality of first conductor lines, a second conductor line group made up of a plurality of second conductor lines, and a third conductor line group line made up of a plurality of third conductor lines are arranged so as to intersect with one another.

According to a sixth aspect of the present invention, there is provided a non-rectangular pixel array including a non-display portion with no pixels and with a non-rectangular contour shape formed inside of said non-rectangular pixel array and a plurality of non-rectangular pixels so arranged that a first conductor line group made up of a plurality of first conductor lines, a second conductor line group made up of a plurality of second conductor lines, a third conductor line group made up of a plurality of third conductor lines intersect with one another.

According to a seventh aspect of the present invention, there is provided a pixel array, wherein each of the plurality of non-rectangular pixels forms a color pixel with any one of colors out of a plurality of specified colors for color display and a unit pixel for the color display is constructed by a combination of the color pixels emitting the plurality of colors and wherein the color pixels emitting the plurality of colors are arranged in a state in which a number of color pixels emitting same color being adjacent, in a line-like manner, to each of the color pixels is set to be one or zero.

According to an eighth aspect of the present invention, there is provided a non-rectangular pixel array made up of non-rectangular pixels functioning as a plurality of kinds of sub-pixels having non-rectangular shapes different from one another and, by electrically changing a combined pattern of the plurality of kinds of sub-pixels, setting for non-rectangular pixel display or rectangular pixel display is allowed to be done or change in the setting is allowed to be made.

With the above configuration, it is made possible to realize the oddly shaped (non-rectangular) pixel array and the display device having a smooth and gentle outer circumferential shape without sacrificing brightness, viewability, and fidelity of an image. Particularly, in the case of using a color pixel, the number of color pixels having a same color and being adjacent to one another in a line-like manner is not more than one and, therefore, irregular colors can be reduced and a smooth and gentle outer circumferential contour can be expressed. More specifically, by using the non-rectangular pixel array of the present invention, the display device being excellent in designing property and functionality can be achieved. For example, the display device, having a highly designing property, with an outer shape being approximately similar to the outer circumferential shape of the pixel array can be realized. In particular, when a color pixel is used, the number of color pixels having a same color and being adjacent to one another in a line-like manner is not more than one and, therefore, it is possible to realize display device having an outer shape being approximately similar to an outer circumferential shape of the pixel array.

Further, in the another configuration of the present invention, the non-rectangular pixel functions as a plurality of kinds of sub-pixels having the non-rectangular shape being different from one another and, by electrically changing combined patterns of the plurality of kinds of sub-pixels, setting for non-rectangular pixel display or rectangular pixel display is allowed to be done or change in the setting is allowed to be made. Therefore, the combination method of sub-pixels can be changed without changing the pixel array, and suitable display corresponding to display contents can be achieved. Moreover, the non-rectangular non-display portion such as a hollow aperture can be mounted easily in the pixel array and, therefore, the display device being excellent not only in designing property but also functionality can be easily achieved.

Moreover, by configuring the display device so as not to cross conductor lines in a pixel, the aperture rate of a pixel can be increased and, as a result, light-use efficiency can be improved, which provides a bright screen and good viewability and reduced power consumption. Wiring design in a pixel area can be done without causing an increase in parasitic capacitance and, therefore, production yield and reliability of the pixel array, that is, the display device can be achieved. In addition, three kinds of conductor lines intersect with one another and, therefore, the non-rectangular pixel unit to be formed is a single repetition unit, which is effective in reducing moiré.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EXEMPLARY EMBODIMENTS

Best modes of carrying out the present invention will be described in further detail using various exemplary embodiments with reference to the accompanying drawings. First, an outline of exemplary embodiments is described. According to exemplary embodiments of the present invention, a non-rectangular display device is made up of non-rectangular pixels and configured so that at least three types of conductor line (wirings) groups intersect with one other in each portion in which the conductor lines surround each pixel. Thus, in the non-rectangular display device using the non-rectangular pixels, when the conductor lines of at least three types each corresponding to a pixel intersect with one another, a length of one given conductor line corresponding to a pixel crossing each pixel is allowed to be shortened compared with a case of a configuration where conductor lines do not intersect with one another and, if necessary, a crossing length can be designed so as to be the shortest (FIG. 35B).

Figure 35A:
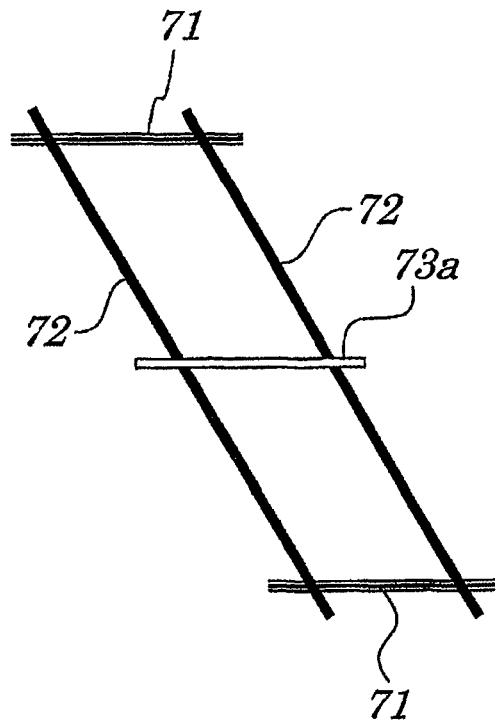
FIGS. 35A and 35B are diagrams provided to explain an outline of the preferred exemplary embodiments of the present invention.
Figure 35B:
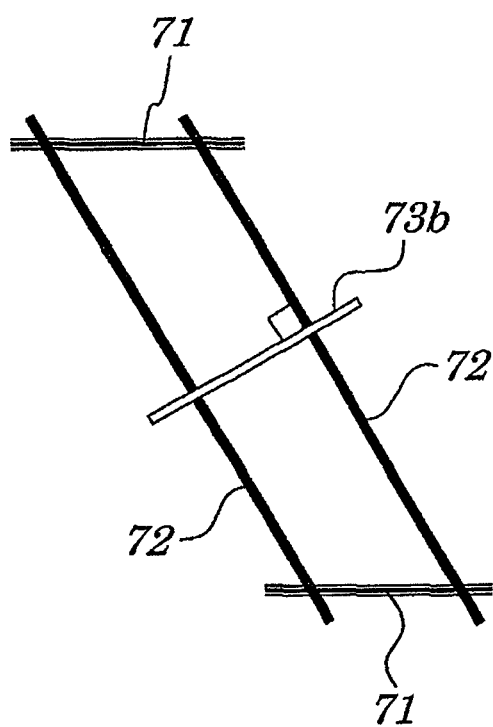
Figure 36A:
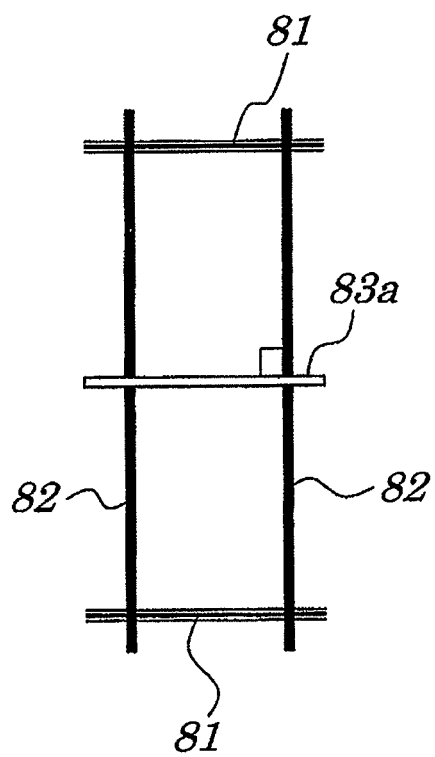
FIGS. 36A and 36B are diagrams provided to explain the outline of the preferred exemplary embodiments of the present invention.
Figure 36B:
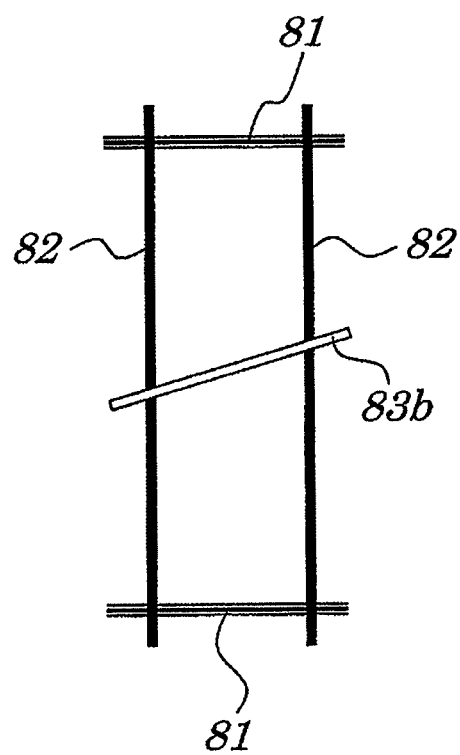

The above points are described by referring to FIGS. 35A and 35B. FIGS. 35A and 35B are diagrams showing the configuration in which a third conductor line 73a or 73b crosses a region of a non-rectangular pixel 70 surrounded by a first conductor line 71 and second conductor line 72. FIG. 35A shows an example in which the wiring of the third conductor line 73a is carried out in a manner to be parallel to the first conductor line 71. FIG. 35B shows an example in which the wiring of the third conductor line 73b is carried out in a manner to be non-parallel to the first and second conductor lines 71 and 72. The third conductor line 73b intersects both the first and second conductor lines 71 and 72 and also intersects the second conductor line 72 in a manner to be orthogonal thereto. FIGS. 36A and 36B are diagrams showing the configuration in which a third conductor line 83a or 83b crosses a region of a non-rectangular pixel 80 surrounded by a first conductor line 81 and second conductor line 82. FIG. 36A shows an example in which the wiring of the third conductor line 83a is carried out in a manner to be parallel to the first conductor line 81 and the third conductor line 83a intersects the second conductor line 82 in a manner to be orthogonal thereto. FIG. 36B shows an example in which the wiring of the third conductor line 83b is carried out in a manner to be non-parallel to the first and second conductor lines 81 and 82. The third conductor line 83b intersects both the first and second conductor lines 81 and 82. The region of the non-rectangular pixel 70 shown in FIGS. 35A and 35B and the region of the rectangular pixel 80 shown in FIGS. 36A and 36B has the same base and height and, therefore, the same area.

Out of the above arrangement examples, the arrangement example in which the distance through which the third conductor line crosses the pixels 70 and 80 is the shortest is the example shown in FIG. 35B. Therefore, by employing the configuration (shown in FIG. 35B) in which the first, second, and third conductor line group intersect with one other defining the area of the non-rectangular pixel, the length of the third conductor line 73b crossing the pixel 70 can be shortened and can be designed so that the length crossing the pixel becomes the minimum, which enables a pixel aperture ratio exerting an influence upon the brightness of the pixel to be designed to be high. Also, when the third conductor line intersects the second conductor line at an angle being nearer to a right angle, the area of the intersected portion can be made the smaller, thus enabling the reduction of accompanied parasitic capacitance and of the delay of a signal which changes depending on the length of a conductor line and on the area of an intersected portion.

According to the best mode of the present invention, a pixel is non-rectangular and, therefore, unlike in the case of a rectangular pixel, no stepwise pixel arrangement occurs in an outer circumferential portion of a display area and a pixel can be arranged so as to have a shape suitably representing an outer shape desired to be realized.

The reason for this is that, since a shape of a pixel is not rectangular, the arrangement of the pixel is not defined by two axes intersecting orthogonally. For example, a pixel can be arranged along two axes intersecting with each other at an angle being not a right angle (for example, parallelogrammic pixel) or the pixel can be arranged along three axes intersecting with one another (for example, triangular pixel). In other words, in the configuration in which pixels are arranged along two axes intersecting with each other at an angle being not a right angle or in the configuration in which the pixels are arranged along three axes intersecting with one another, unlike in the configuration in which the pixels are arranged along two axes intersecting with each other at a right angle (for example, rectangular pixel), directional freedom of the arrangement is enhanced. The directional freedom here denotes the freedom in a translational direction when the arrangements of all pixels are based on translation only.

In the configuration in which the pixel is arranged along two axes intersecting with each other at a right angle, translation in independent two-axis directions is limited to a right angle direction only, however, in the configuration in which the pixel is arranged along two axes at an angle being not a right angle (for example, triangular pixel), the translation in independent two-axis directions is not limited to a right angle. Further, in the configuration in which the pixel is arranged along three axes intersecting with one another, translation in independent three-axis directions is made possible. By using sub-pixels of two kinds having three axes of translation and having no rotational symmetry (for example, sub-pixel of a triangular shape with its vertex directed upward and a sub-pixel of a reverse triangular shape with its vertex directed downward), more complicated translation can be determined which enables an outer shape of a display area in a direction other than a right angle direction to be easily realized and also enables an image outer shape being free of jaggies to be displayed. Additionally, according to the exemplary embodiment of the present invention, as the non-rectangular display device, it is made possible to realize a very oddly shaped display device, for example, having a hollow portion or through-hole portion in a display area, whereby the present invention is contributable to the enhancement of design result on an appearance of a display device.

First Exemplary Embodiment

Figure 1:
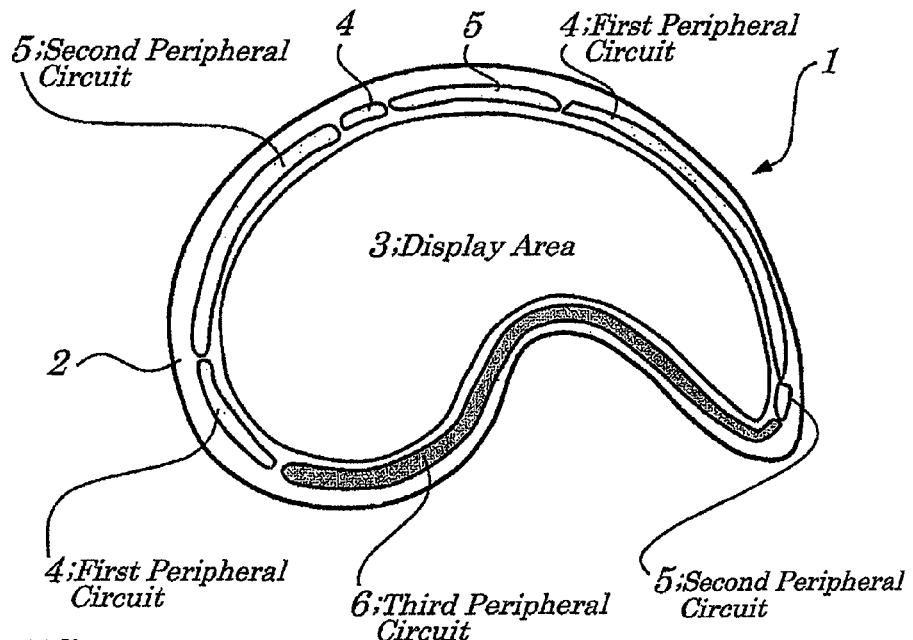
FIG. 1 is a front view diagrammatically showing a configuration of a non-rectangular display device according to a first exemplary embodiment of the present invention.
Figure 2:
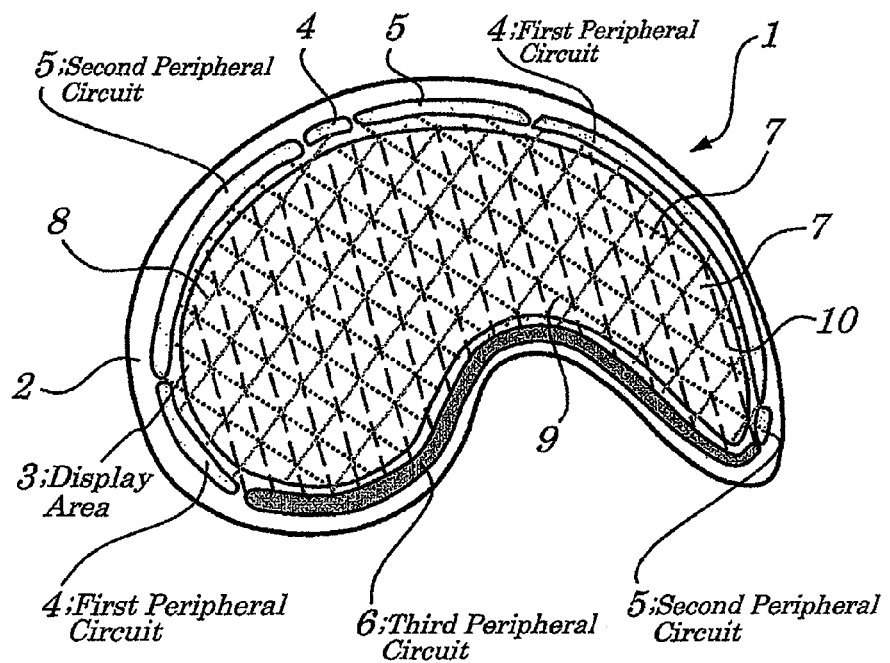
FIG. 2 is a front view diagrammatically showing pixels in a display area and wiring patterns of various types making up the non-rectangular display device of FIG. 1 as a reference example of the present invention.
Figure 3:
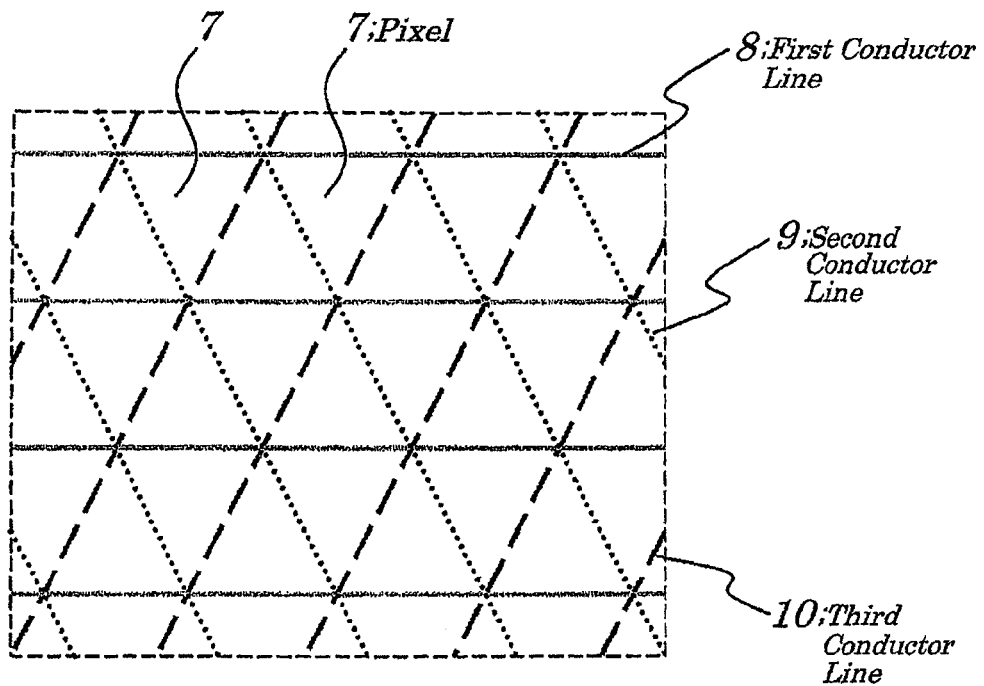
FIG. 3 is an enlarged view schematically showing one part of the display area of FIG. 2 as a reference example of the present invention.
Figure 4:
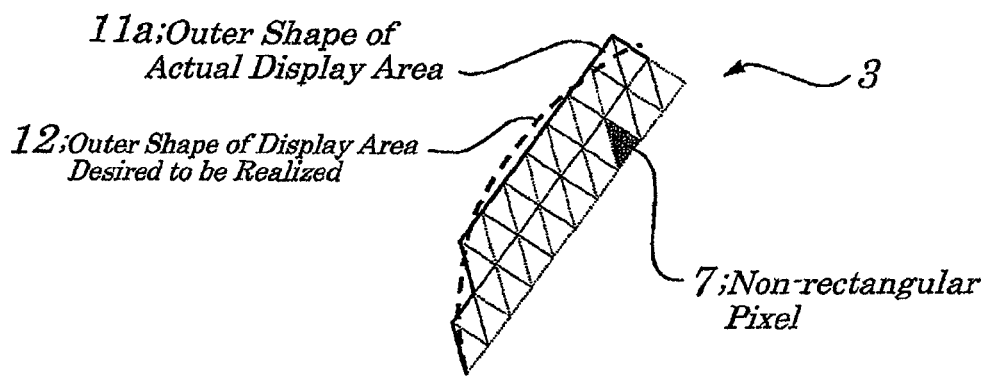
FIG. 4 is an enlarged view schematically showing an outer circumferential portion of the display area of FIG. 2 as a reference example of the present invention.

Hereinafter, the first exemplary embodiment (including reference examples) of the present invention is described by referring to drawings. FIG. 1 is a front view diagrammatically showing a configuration of a non-rectangular display device according to the first exemplary embodiment. FIG. 2 is a front view diagrammatically showing pixels in a display area and wiring patterns of various types making up the display device of FIG. 1 (as a reference example of the present invention. FIG. 3 is an enlarged view schematically showing one part of the display area of FIG. 2 as a reference example of the present invention. FIG. 4 is an enlarged view schematically showing, in a partially enlarged manner, an outer circumferential portion of the display area of FIG. 2 as a reference example of the present invention. The display device 1 of the first exemplary embodiment, as shown in FIGS. 1 and 2, is a non-rectangular display device, an outer portion of which has a comma-shaped-bead-like shape (MAGATAMA) and is mainly made up of a comma-shaped-bead-like substrate 2, a display area (pixel area) 3 having a comma-shaped-bead-like shape being an almost same shape (similar figure) as the substrate 2 on a surface of the substrate 2, and first peripheral circuits 4, 4, . . . , second peripheral circuits 5, 5, . . . ,and a third peripheral circuit 6. The first peripheral circuits 4, 4, . . . , second peripheral circuits 5, 5, . . . , and third peripheral circuit 6 each have a long straight-line shape or long-curved shape and are arranged respectively, in a dispersed manner, in a region between an outer circumferential portion of the display area 3 and an outer circumferential portion of the substrate 2.

The above display area 3 is made up of a plurality of non-rectangular pixels 7, 7, . . . having various shapes including a triangle with its vertex directed upward, reverse triangle with its vertex directed downward, parallelogram, or the like. Each of the non-rectangular pixels 7, 7, . . . is formed by a first conductor line group made up of a plurality of first conductor lines 8, 8, . . . , second conductor line group made up of a plurality of second conductor lines 9, 9, . . . , and third conductor line group made up of a plurality of third conductor lines 10, 10, . . . , in which the wiring of all these conductor lines is carried out in a multilayered state on the substrate 2 in a manner in which these conductor lines intersect with one another. The plurality of non-rectangular pixels 7, 7, . . . are arranged two-dimensionally and arranged in a comma-shaped-bead-like manner and an active element or pixel electrode formed in every pixel is connected to a corresponding one of the first conductor lines 8, 8, . . . , second conductor lines 9, 9, . . . , and third conductor lines 10, 10, . . . . Moreover, for simplification, it is shown in FIG. 2 that the number of the first conductor lines 8, 8, . . . , second conductor lines 9, 9, . . . , and third conductor lines 10, 10, . . . is smaller than that used in an actual display device.

The above first peripheral circuits 4, 4, . . . drive the first conductor lines 8, 8, . . . which belong to the first conductor line group. According to the comma-shaped-bead-like display area of the first exemplary embodiment, for example, all the first conductor lines 8, 8, . . . arranged in the display area 3 can be driven by three first peripheral circuits 4, 4, . . . formed in an outer circumferential portion of the substrate 2. The second peripheral circuits 5, 5, . . . drive the second conductor lines 9, 9, . . . which belong to the second conductor line group. In the first exemplary embodiment, for example, all the second conductor lines 9, 9, . . . arranged in the display area 3 can be driven by three second peripheral circuits 5, 5, . . . formed in an outer circumferential portion of the substrate 2. The third peripheral circuit 6 drives the third conductor lines 10, 10, . . . which belong to the third conductor line group. In the first exemplary embodiment, for example, all the third conductor lines 10, 10, . . . arranged in the display area 3 can be driven by one piece of third peripheral circuit 6 formed in an outer circumferential portion of the substrate 2.

Here, the display device may be configured so that each conductor line belonging to a given one conductor line group out of the first, second, and third conductor line groups plays a role of a row conductor line and each conductor line belonging to a given other conductor line group plays a column conductor line or first column conductor line or each conductor line is configured to play a role of the column conductor line or the first column conductor line, or each conductor line belonging to a remaining group plays a role of the second column conductor line or, for example, of a storage capacitance line, conductor line group to supply a common electrode potential, power source line to supply a given fixed potential or given potential which changes periodically or of a signal line or the like (see first to fourth exemplary embodiments).

In the first exemplary embodiment, as shown in FIGS. 2 and 3, a given first conductor line 8, second conductor line 9, third conductor line 10, . . . are so arranged as to intersect with one another at a point and each of three intersection points forms a vertex of a region of a triangle (pixel 7 or half of the pixel) formed by the first, second, third conductor lines 8, 9, 10 . . . . The region of the triangle surrounded by these three kinds of conductor lines 8, 9, 10 . . . corresponds to each non-rectangular pixel and, in FIG. 2, each non-rectangular pixel is shown as a triangle each side of which is different from one another, however, the shape of the non-rectangular pixel is not limited to this and the shape may be right-triangular or isosceles triangular or approximately triangular (oddly shaped triangle). Moreover, FIG. 3 is a partially enlarged diagram showing a display area in FIG. 2 and, in FIG. 3, each pixel is shown, for convenience, as an isosceles triangle being near a right triangle. In the first exemplary embodiment, as shown in FIG. 3, an angle at which one conductor line playing a role of a row conductor line intersects another conductor line playing a role of a column conductor line, out of the three conductor lines, is set to be 65 degrees, however, the angle is not limited to this and any given angle may be employed which can be determined when necessary.

In the first exemplary embodiment, as shown in FIG. 2, the first, second, and third peripheral circuits 4, 5, and 6 can be easily arranged without interfering (conflicting) with one another. Also, in the first exemplary embodiment, basically, a triangle is used as a unit of iteration and, therefore, very easy design can be realized when compared with the conventional configuration.

Figure 47:
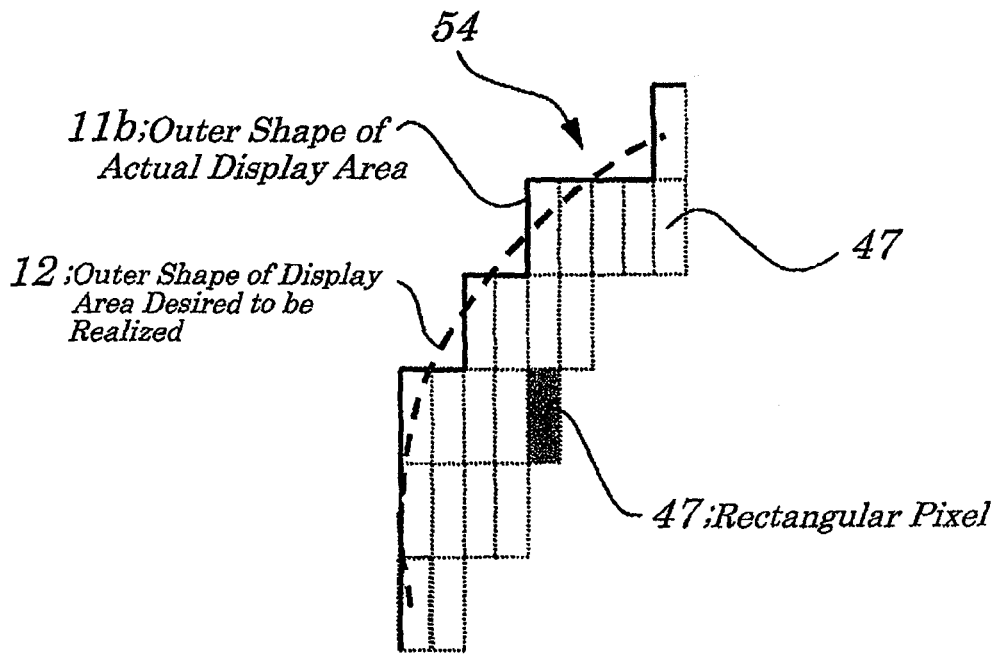
FIG. 47 is a diagram provided to explain problem points of the related art display device.

FIG. 4 is an enlarged view showing an outer circumferential portion of the display device of the first exemplary embodiment. Moreover, in order to clarify the triangular pixel 7 and the outer circumferential portion of the display area 3, one pixel is selected and filled with black while various conductor line groups formed by the first, second, third conductor lines 8, 9, 10 . . . are not shown in FIG. 4. As shown in FIG. 4, the outer shape 11a of the display area 3 made up of the non-rectangular pixels 7, 7, . . . can not cover or follow completely an outer shape 12 (shape of outer circumferential curved region) of the display area desired to be realized, however, as is apparent when compared with the outer shape 11b (see FIG. 47) of the conventional non-rectangular display area using the rectangular pixels 47, 47, . . . , can cover or follow the outer shape 12 of the display area desired to be realized. That is, in the case of the display area using the conventional rectangular pixels 47 shown in FIG. 47, an ability to follow (reproduce) the outer shape desired to be realized is poor, thus causing greatly jagged outer shapes.

Thus, in the non-rectangular display device using the conventional rectangular pixels 47, 47, . . . , the outer shape of the display device gives a jagged edge appearance and impairs the beauty and appearance produced by a non-rectangular shape. In the non-rectangular display area 7 of the exemplary embodiment of the present invention, the jaggies in the outer shape are reduced, thus enabling the beauty and appearance produced by the non-rectangular shape to be maintained.

According to the exemplary embodiment, since the non-rectangular pixels are used, the arrangement of pixels is not limited by two axes intersecting orthogonally with each other and, for example, the pixels can be arranged along two axes intersecting with each other at an angle being not a right angle (for example, parallelogrammic pixels) and can be arranged along three axes intersecting with one another (for example, triangular pixels) and, as a result, as shown in FIG. 2, the first, second, and third peripheral circuits 4, 5, and 6 can be easily placed without causing the interference (conflict) with one another. Moreover, in the first exemplary embodiment, basically, a triangle is used as a unit of iteration and, therefore, very easy design can be realized when compared with the conventional configuration.

Figure 5:
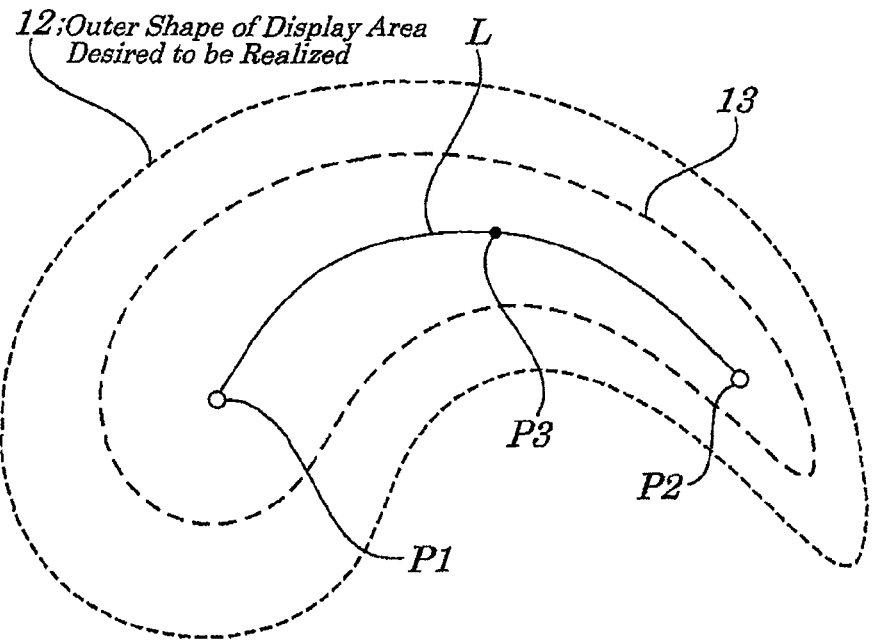
FIG. 5 is a diagram provided to explain display operations according to the first exemplary embodiment of the present invention.
Figure 6:
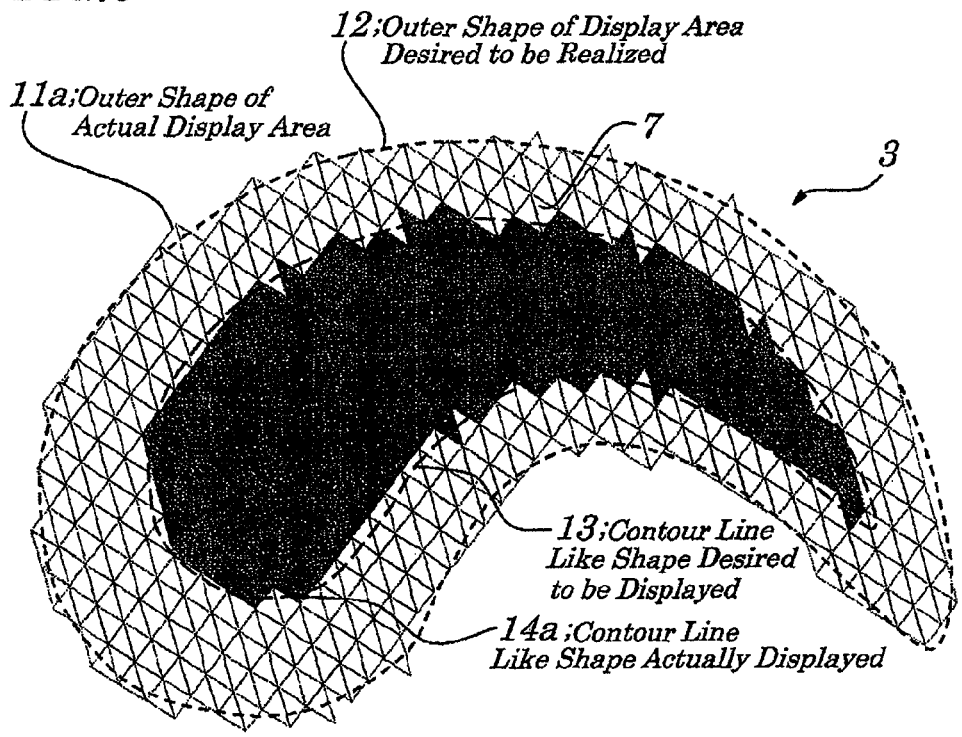
FIG. 6 is also a diagram provided to explain the display operations according to the first exemplary embodiment of the present invention.
Figure 7:
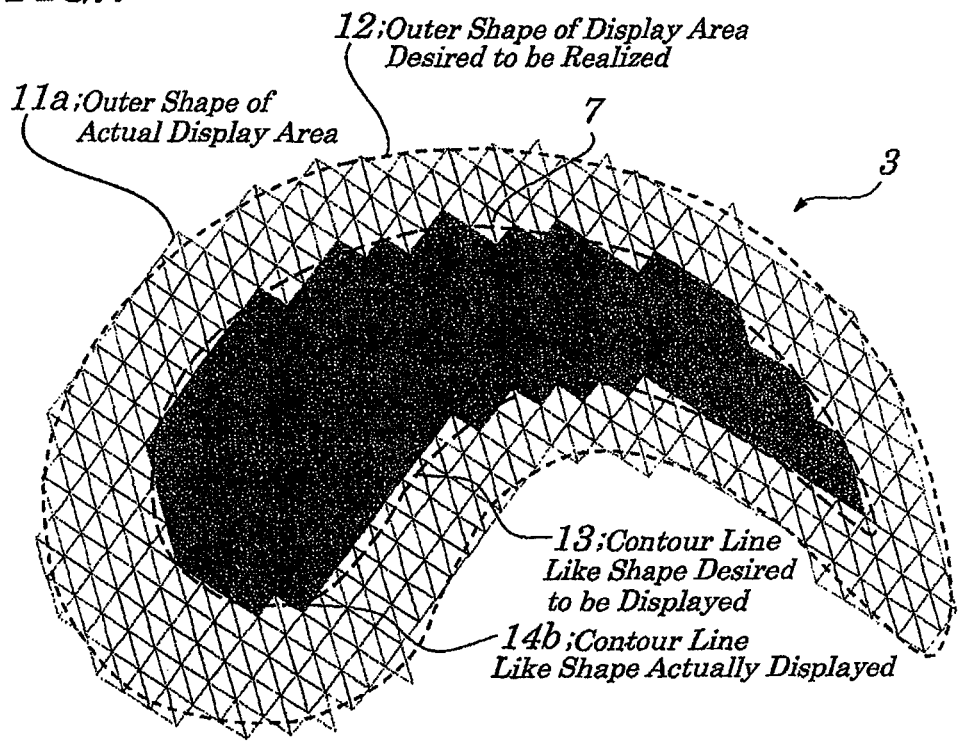
FIG. 7 is also a diagram provided to explain the display operations according to the first exemplary embodiment of the present invention.
Figure 13:
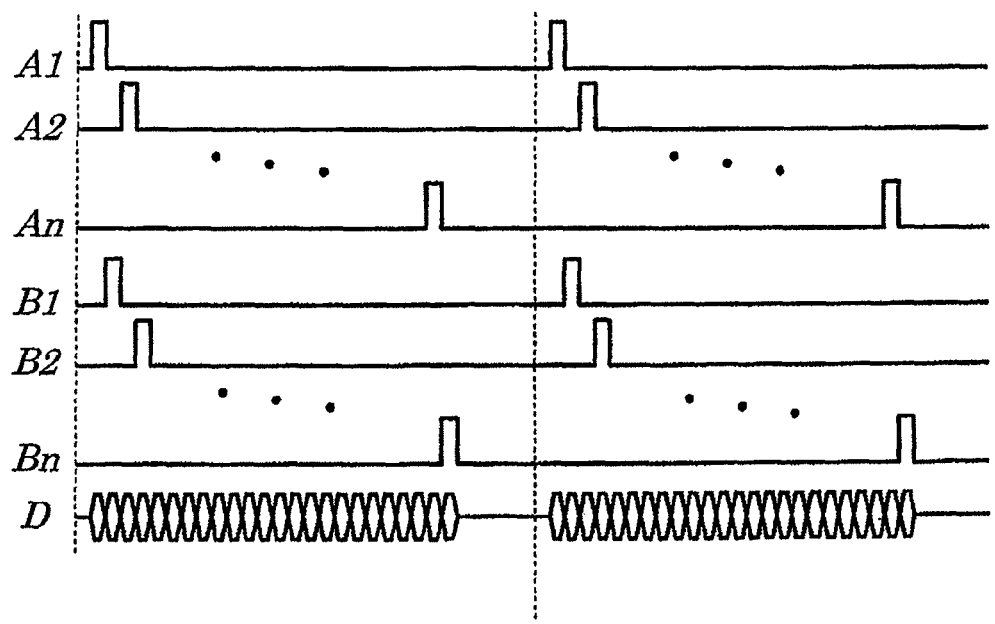
FIG. 13 is a timing chart provided to explain a second driving method of the display area of FIG. 10.

Next, display operations of the display device of the first exemplary embodiment of the present invention are described by referring to FIGS. 5 to 7. When graphics inter-correlated with an outer circumferential shape of a display area desired to be realized are to be displayed, a contour line like FIG. 13 is displayed which is formed by a line obtained by equally dividing a line linking between each point in an outer circumferential portion of the display area 3 and (a plurality of) given points in the display area 3 into portions each having an approximately equal distance according to a specific rule. That is, in the display area 3, two points P1 and P2 (hollow points in FIG. 5) as points corresponding to a peak on a map are selected first. Next, weights are assigned to the selected two points P1 and P2 by assigning a value corresponding to a height above the sea level to be used in a map. Here, the point to which a larger value is assigned has a higher weight. A segment linking between these two points P1 and P2 corresponds to a ridge (ridgeline) to be used in a map. For example, as a segment L corresponding to the ridge, part of a curve corresponding to an outer shape is selected. By equally dividing the segment L corresponding to the ridge by a distance along the segment between these two points P1 and P2 and by comparing the result from the equal division with a result obtained by diving a difference in values between the two points P1 and P2, a value is assigned to each point on the ridge. By equally dividing a segment linking between each point on the ridge obtained as above and each point of an outer circumferential portion of the display area 3 by a distance along the segment and by simultaneously comparing the result from the equal division with a result from the equal division of a difference of a value between two points, a value is assigned to the entire display area 3. Next, based on values assigned to the display area 3, equal value lines are formed to obtain the FIG. 13 (which has a contour line like shape inter-correlated with an outer circumferential shape of the display area desired to be realized) desired to be displayed in the display area 3.

Figure 48:
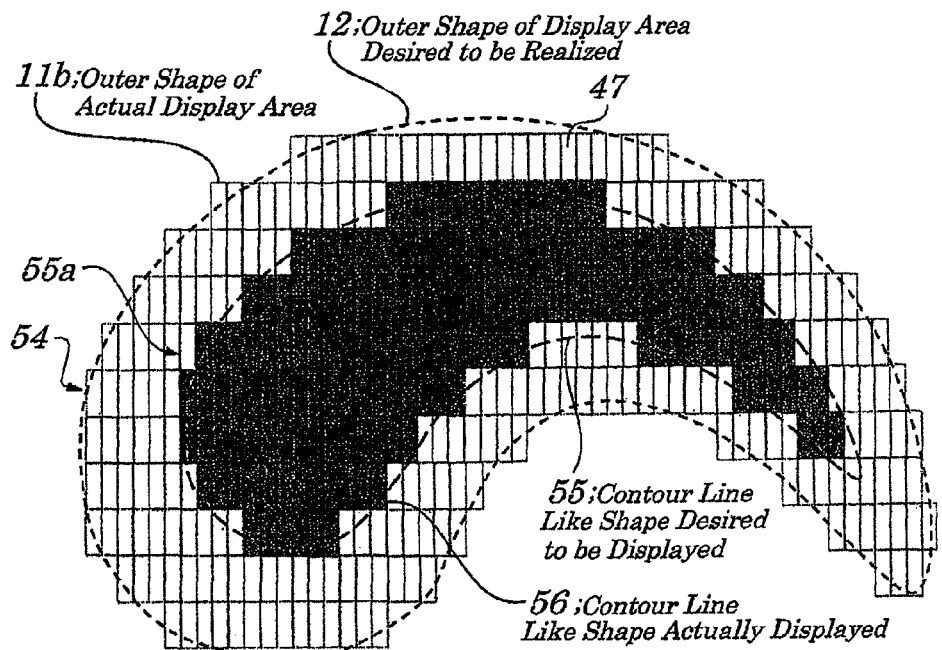
FIG. 48 is a diagram provided to explain problem points of the related art display device.
Figure 49:
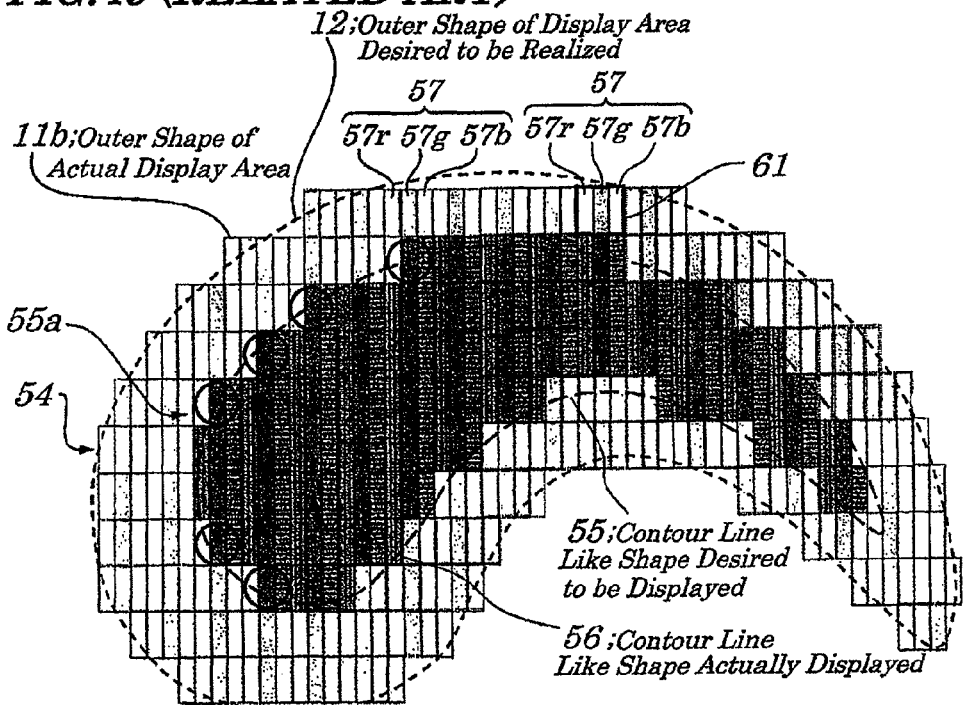
FIG. 49 is a diagram provided to explain problem points of a related art color display device.

FIG. 6 is a diagram showing one example of a contour line like graphics actually displayed on the display area 3. Moreover, a comparative example is shown in FIG. 48 in which a contour line like graphics 55 inter-correlated with an outer circumferential shape of a non-rectangular display area using the conventional rectangular pixels 47, 47, . . . . It is understood from the comparative example in FIG. 48 that the contour line like graphics 56 actually displayed is considerably different from the contour line like graphics 55 desired to be displayed. It is also understood from the comparative example in FIG. 48 that an outer circumferential portion in the contour line like graphics 56 to be displayed is greatly jagged (saw-toothed). On the other hand, according to the contour line like graphics of the first exemplary embodiment in FIG. 6, the jagged edge appearance on the outer circumferential portion of the contour line like graphics 14a actually displayed is greatly reduced.

In the display example of the graphics in FIG. 6, a pixel to be displayed or a pixel not to be displayed is determined according to a ratio of an area occupied by a region desired to be displayed to the area of the pixel 7. As a result, a pixel whose position is opposite to an average gradient of an outer circumferential portion exists, which partially causes the occurrence of jagged edges. The jagged edges can be reduced by performing a software process. FIG. 7 shows an example in which the jagged edges s are further reduced by performing the software process. The software process here stands for a process in which, when a direction of a gradient formed by a pixel actually displayed is opposite to the gradient of the circumferential portion of the graphics 13 desired to be displayed, the pixel is not displayed. According to the software process described above, as shown in FIG. 7, a smoother pseudo curve 14b can be displayed when compared with results from the process in FIG. 6. Moreover, in the comparative example in FIG. 48, the same software process as described above is not allowed to be performed and, therefore, in the display example in FIG. 7, more excellent image display having extremely fewer jagged edges can be achieved when compared with the conventional case in FIG. 48.

Further, in a modified example, by making a segment L on a ridge more complicated, a design result reflecting the complicated state can be obtained. For example, points to be assigned to the segment L on the ridge are increased, when, if necessary, points having values being small than those of points corresponding to a peak of the segment of the ridge are assigned. More specifically, the point P3 (FIG. 5) having values being smaller than those of points corresponding to two peaks is assigned between the above two points P1 and P2. The values of the two peaks are different from each other. At this time, values corresponding to the ridge linking between a large peak and a small peak are allowed to be assigned to the segment of the ridge. By using the above method, the contour-line like graphics can be adjusted in a given manner, thus enabling a highly effective design result to be realized.

The non-rectangular display device of the first exemplary embodiment can be installed on various devices. The example of the devices in which the non-rectangular display device can be suitably used includes a mobile phone, game terminal, audio player or video player such as MP3 player (MPEG Audio Layer-3), combined devices thereof, devices embedded in a pendant or accessories (This is true for other exemplary embodiments described later). Moreover, the device of the exemplary embodiment, if necessary, may be configured so that a driving signal is supplied from an external circuit without using the peripheral circuits. Even in the wiring configuration not using the peripheral circuit, according to the exemplary embodiment, an electrode terminal for outside drawing can be arranged, in a manner to have good compatibility, in a non-rectangular shaped outer circumferential portion of the substrate.

Next, the display area making up the display device of the exemplary embodiment of the present invention is described in detail by using examples of the first exemplary embodiment.

EXAMPLE 1

Figure 8:
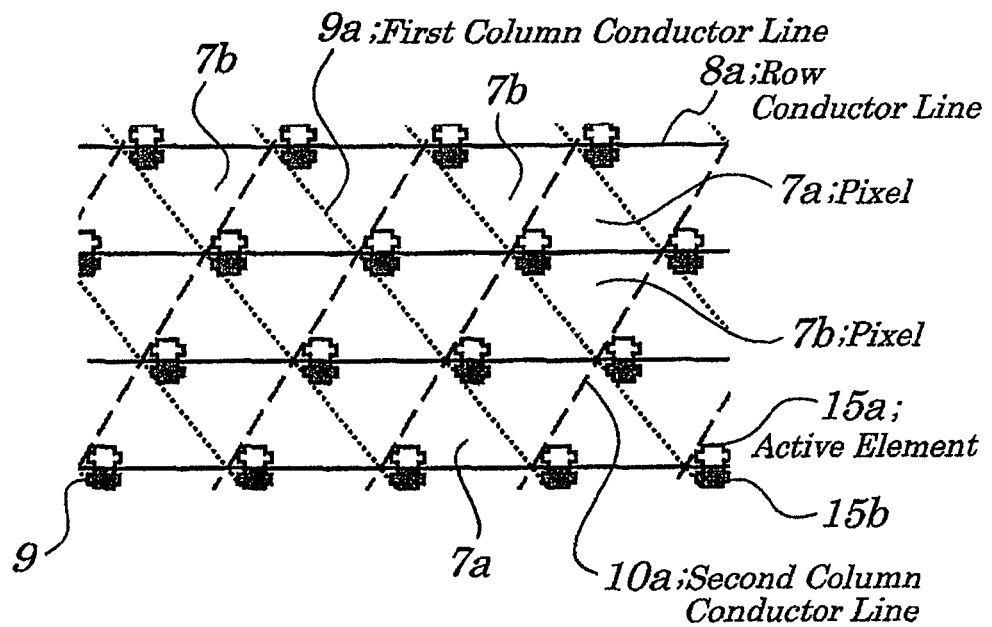
FIG. 8 is a diagram schematically and partially showing electrical configurations of a display area of a first example (reference example) of the first exemplary embodiment.

FIG. 8 is a diagram schematically and partially showing electrical configurations of a display area of a first example (reference example) of the first exemplary embodiment. The display area of the example 1, as shown in FIG. 8, is configured so that many first conductor line groups made up of a plurality of row conductor lines 8a, 8a, . . . arranged in parallel to each other along a first direction with a specified interval therebetween, many second conductor line groups made up of a plurality of first column conductor lines 9a, 9a, . . . arranged in parallel to each other along a second direction with a specified interval therebetween, and many third conductor line groups made up of a plurality of second column conductor lines 10a, 10a, . . . arranged in parallel to each other along a third direction with a specified interval therebetween, are arranged on a substrate and each of the row conductor lines 8a, first column lines 9a, second column conductor lines 10a is connected to each of active elements 15a and 15b each made up of a TFT (Thin Film Transistor).

In the example, the pixel (hereafter, upward triangular pixel) forming a triangle with its vertex directed upward 7a in which active elements 15a are arranged and the pixel 7b forming a triangle with its vertex directed downward in FIG. 8 where active element 7b are arranged (hereinafter, downward directed pixel) are arranged alternately and the triangular pixel 7a in which the active elements 15a are connected is accessed by the row conductor line 8a and first column conductor 9a and the reverse-triangular pixel 7b in which active elements 15b are connected is accessed by the row conductor line 8a and second column conductor line 10a. More specifically, a scanning signal is inputted through the row conductor line 8a from the first peripheral circuit 4 to the active elements 15a and 15b and image data is inputted through the first or second column conductor line 9a and 10a from the second or third peripheral circuit 5 or 6 to the active elements 15a and 15b.

According to the configurations of the example 1, the pixels arranged based on three directional translocation can be freely driven and, therefore, by inputting image data from the first or second column conductor line 9a or 10a, an image can be displayed on an entire screen (display area). In the example, as shown in FIG. 2, the first, second, and third peripheral circuits 4, 5, and 6 can be readily arranged without interfering with one another. Moreover, in the example, basically, a triangle is used as a unit of iteration and, therefore, very easy design can be realized when compared with the conventional configuration. Further, as shown in FIG. 8, the active elements 15a and 15b are regularly arranged for every two pixels and, therefore, based on a minimum unit of iteration (in the example, parallelogram obtained by adding two pixels 7a and 7b paired with the triangles directed non-inversely and inversely), the display area having various shapes can be easily designed. In addition, the configuration of the arrangement based on a single unit of iteration is effective in reducing moiré.

In the example, the first conductor line group is configured to function as a collection made up of the row conductor lines 8a, 8a, . . . , the second conductor line group is configured to function as a collection made up of the first column conductor lines 9a, 9a, . . . , and the third conductor line group is configured to function as a collection made up of the second column conductor lines 10a, 10a, . . . , however, the configuration is not limited to this. That is, the first conductor line group may be configured to function as a collection made up of the first column conductor lines or second conductor lines and the second conductor line group may be configured to function as a collection made up of the second conductor lines or row conductor lines and the third conductor line group may be configured to function as a collection made up of the row conductor lines or first column conductor lines.

EXAMPLE 2

Figure 9:
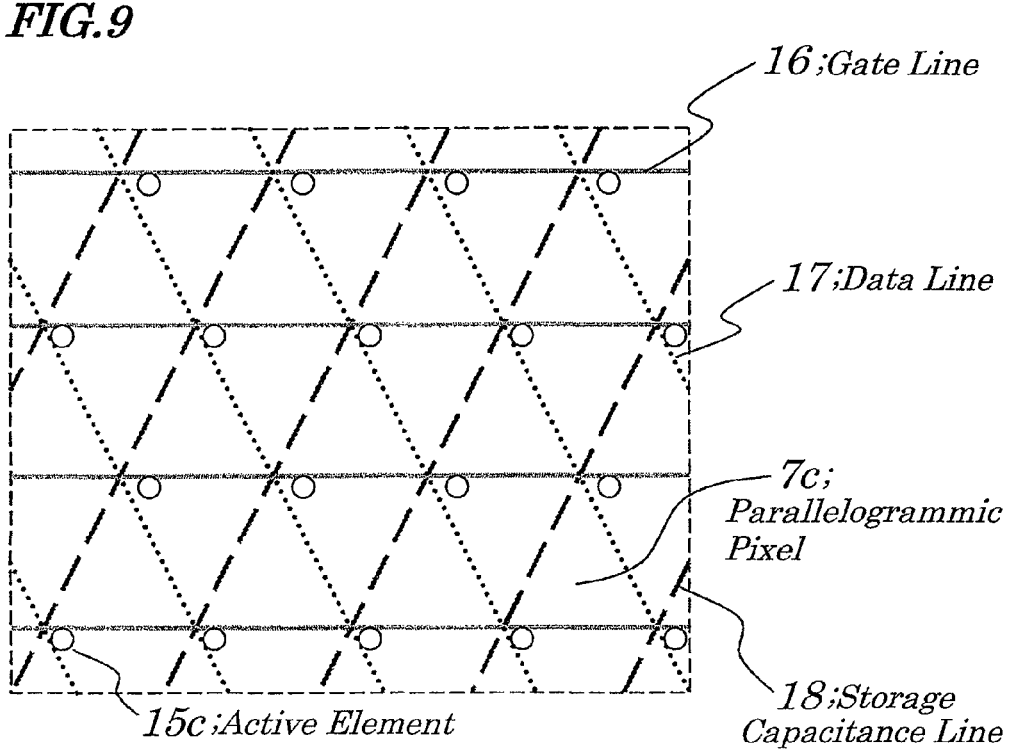
FIG. 9 is a diagram schematically and partially showing electrical configurations of a display area of a second example (reference example) of the first exemplary embodiment.

FIG. 9 a diagram schematically and partially showing electrical configurations of a display area according to a second example (reference example) of the first exemplary embodiment. The display area of the second example of the first exemplary embodiment, as shown in FIG. 9, is configured so that many first conductor line groups made up of a plurality of gate lines 16, 16, . . . arranged in parallel to each other along a first direction with specified interval therebetween, many second conductor line groups made up of a plurality of data lines 17, 17, . . . arranged in parallel to each other along a second direction with a specified interval therebetween, and many third conductor line groups made up of a plurality of storage capacitance lines 18, 18, . . . arranged in parallel to each other along a third direction with a specified interval therebetween, are arranged on a substrate and each of the gate lines 16, data lines 17, storage capacitance lines 18 is connected to each of active elements 15c each made up of a TFT mounted on each corresponding pixel (parallelogrammic pixel) 7c. In the example, each pixel is parallelogrammic and an area of each pixel is about twice larger than that of a triangular pixel (FIG. 8). Each pixel 7c is partitioned by a corresponding storage capacitance line 18.

In the example, a scanning signal (address signal) is inputted through a gate line from the first peripheral circuit 4 to a gate electrode of an active element 15c mounted for every parallelogrammic pixel 7c and an image data signal is inputted through a data line from the second peripheral circuit 5 to a data electrode of the active element 15c. One terminal of each of the storage capacitance lines 18, 18, . . . is connected to a pixel electrode and its other terminal is connected to the third peripheral circuit 6. Also, in the example, the pixels arranged based on two directional translocation can be freely driven and, therefore, images can be displayed in the entire screen (display area) by inputting image data from a data line.

In the example, as shown in FIG. 2, the first, second, third peripheral circuits 4, 5, and 6 can be easily arranged without interfering with one another. Also, in the exemplary embodiment, a parallelogram is used as a unit of iteration and, therefore, very easy design can be realized when compared with the conventional configuration. That is, the pixel of the example has translation in two directions only in arrangements, however, has translation at an angle other than a right angle unlike in the conventional device and, therefore, the pixel arrangement following an outer shape to be realized is made possible, thus providing a highly effective design result as the non-rectangular shaped device when compared with the conventional device. Further, as shown in FIG. 9, the active element 15c is regularly arranged for every pixel and, therefore, based on a minimum unit of iteration (in the example, parallelogram), a display area having various shapes can be easily designed. In addition, the configuration of the arrangement based on a single unit of iteration is effective in reducing moiré.

In the example, the first conductor line group is configured to function as a collection made up of the gate lines (row conductor lines) 16, 16, . . . , the second conductor line group is configured to function as a collection made up of the data lines (column conductor lines) 17, 17, . . . , and the third conductor line group is configured to function as a collection made up of the storage capacitance lines 18, 18, . . . , however, the configuration is not limited to this. That is, the first conductor line group may be configured to function as a collection made up of the data lines (column conductor line) or storage capacitance lines and the second conductor line group may be configured to function as a collection made up of the storage capacitance lines or gate lines (row conductor lines) and the third conductor line group may be configured to function as a collection made up of the gate lines (row conductor lines) or data lines (column conductor lines). Moreover, in the example, the case where each pixel is partitioned by a corresponding storage capacitance line 18 is described, however, the configuration is not limited to this and each pixel may be partitioned by a corresponding gate line (row conductor line) 16 or data line (column conductor line) 17.

In addition, the third conductor line group may be configured to function as a collection made up of conductor lines to supply a common electrode potential to each pixel, instead of the storage capacitance lines. Further, the third conductor line group may be configured to function as a collection made up of power lines to supply a given fixed potential or a given potential changing periodically to each pixel, or a signal line, instead of the storage capacitance lines.

EXAMPLE 3

Figure 10:
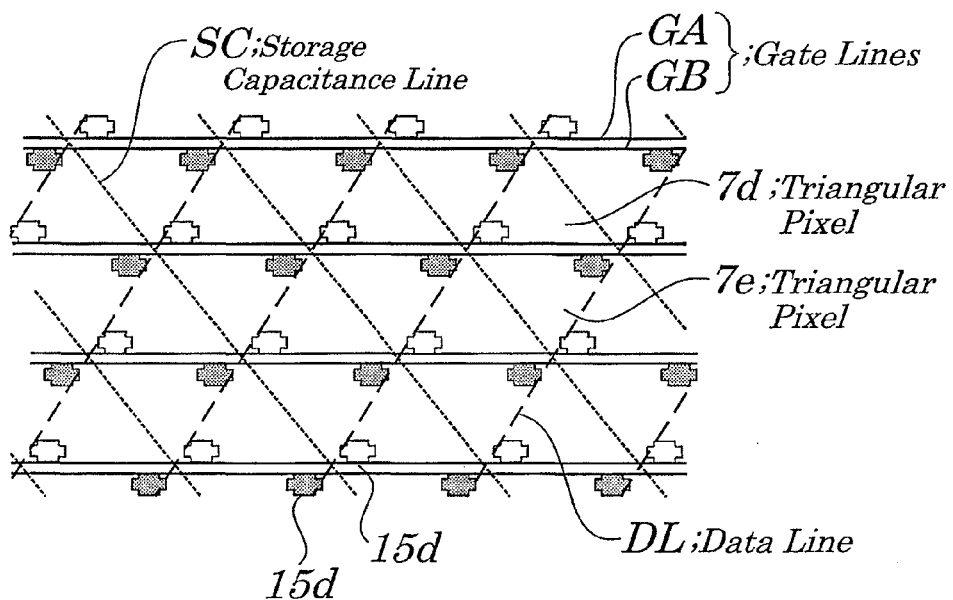
FIG. 10 is a diagram diagrammatically showing an arrangement of active elements in a display area according to a third example of according to the first exemplary embodiment of the present invention.
Figure 11:
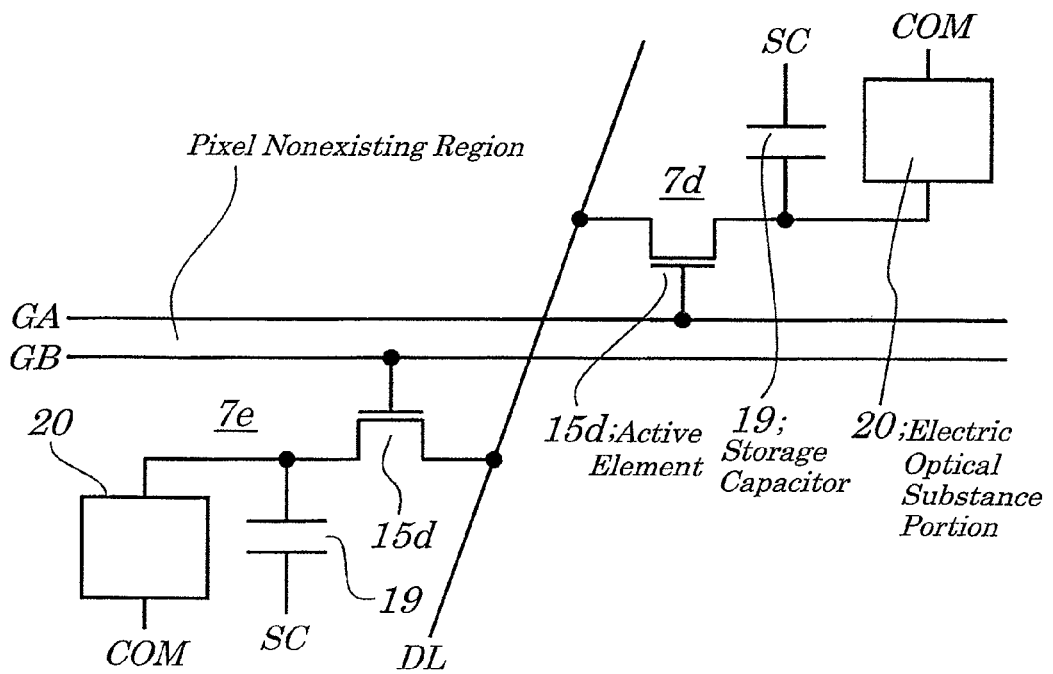
FIG. 11 is a circuit diagram partially showing circuit configurations of the display area of FIG. 10.
Figure 12:
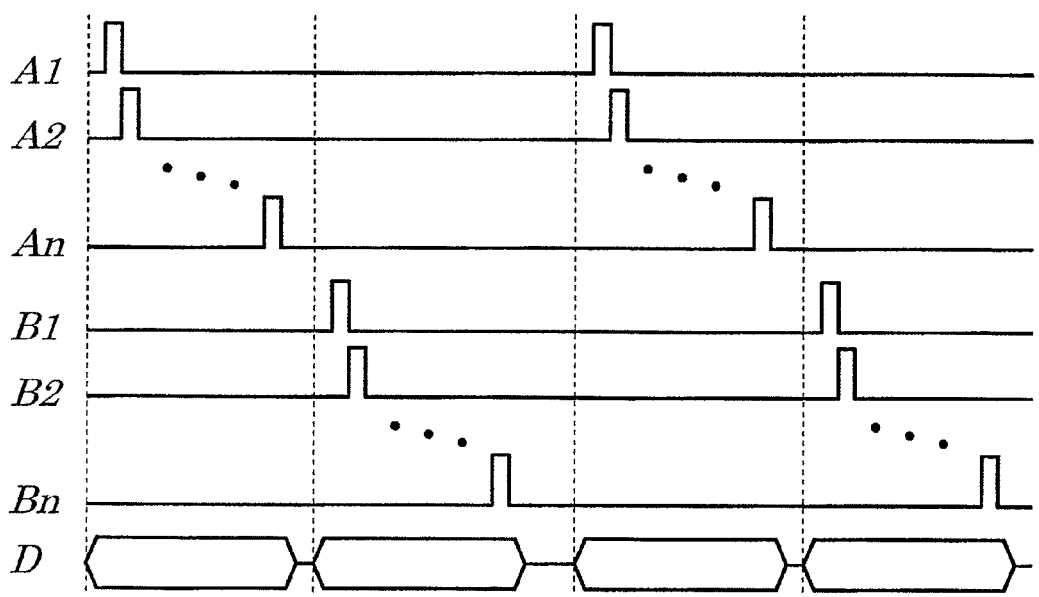
FIG. 12 is a timing chart provided to explain a first driving method of the display area of FIG. 10.

FIG. 10 is a diagram diagrammatically showing the arrangement of an active element in a display area (pixel array) according to a third example of the first exemplary embodiment of the present invention. FIG. 11 is a circuit configuration diagram partially showing circuit configurations of the display area of FIG. 10. FIG. 12 is a timing chart provided to explain a first driving method of the display area of FIG. 10. FIG. 13 is a timing chart provided to explain a second driving method of the display area of FIG. 10.

In the display area of the third example, as shown in FIG. 10 and FIG. 3, each of the first conductor lines 8, 8, . . . serves as a gate line and each of the third conductor lines 10, 10, . . . serves as a data line. More specifically, each of the first conductor lines 8, 8, . . . of FIG. 3 corresponds to two adjacent gate lines GA and GB (that is, two gate lines GA and GB correspond to one conductor line 8) as shown on FIGS. 10 and 11, which are arranged in parallel at relatively close range to each other, each of third conductors lines 10, 10, . . . of FIG 3 corresponds to one data line DL (shown in FIGS.10 and 11), and each of second conductors lines 9, 9, . . . of FIG. 3 corresponds to one storage capacitance line SC (shown in FIG. 10 ).

Each of the triangular pixel directed upward 7d and triangular pixel directed downward 7e shown in FIG. 10 is mainly made up of an active element 15d such as a TFT, a storage capacitor 19, and an electric optical substance portion 20 to serve substantially as an pixel as shown in FIG. 11. In the triangular pixel directed upward 7d, as shown in FIGS. 10 and 11, the gate electrode of the active element 15d is connected to the gate line GA and its source electrode (or its drain electrode) is connected to the data line DL and its drain electrode (or its source electrode) is connected to one terminal of the storage capacitor 19 and one terminal of the electric optical substance portion 20. Another terminal of the storage capacitor 19 is connected to the storage capacitance line SC and another terminal of the electric optical substance portion 20 is connected to the common electrode line COM. In the triangular pixel directed downward 7e, as shown in FIGS. 10 and 11, the gate electrode of the active element 15d is connected to the gate line GB and its source electrode (or its drain electrode) is connected to the data line DL and its drain electrode (or its source electrode) is connected to one terminal of the storage capacitor 19 and one terminal of the electric optical substance portion 20. Another terminal of the storage capacitor 19 is connected to the storage capacitance line SC and another terminal of the electric optical substance portion 20 is connected to the common electrode line COM. As shown in FIG. 10, neither pixel 7d nor pixel 7e exists in a region (i.e., a pixel non-existing region) between adjacent gate lines GA and GB facing each other in parallel at relatively close range, whereas pixels 7d and 7e both exist between adjacent gate lines GA and GB facing each other in parallel at relatively long range.

Moreover, the example of the suitable electric optical substance for the electric optical substance portion 20 includes a liquid crystal, electrophoretic substance, and the like. The exemplary embodiment employs the method in which, by causing an electric field to occur between the active element side substrate on which the gate lines GA and GB, data line DL, storage capacitance line SC, active element 15d such as TFTs, storage capacitor 19 or the like are mounted and facing substrate on which the common electrode is mounted, the electric optical substance such as a liquid crystal and electrophoretic substance is operated. The example mode of the suitable method of this type includes a twist nematic (TM) mode, multi-domain vertical alignment (MVA) mode, polymer network liquid crystal (PNLC) mode, or the like, and this method can be applied to electronic paper using an electrophoretic liquid crystal or cholesteric liquid crystal.

In the above configuration, the triangular pixel directed upward 7b (pixel shown at the upper right of FIG. 11) is controlled by a gate signal flowing through the gate line GA and the triangular pixel directed downward 7e (pixel shown at the lower left of FIG. 11) is controlled by a gate signal flowing through the gate line GB. The triangular pixel directed upward 7d and triangular pixel directed downward 7e are driven according to a time division method for every field or every row through two kinds of gate lines GA and GB mounted in parallel to each other.

Next, operations of the example are described by referring to FIGS. 12 and 13. First, operations by the first driving method of the example are explained by referring to FIG. 12. In FIG. 12, A1 shows a gate signal to be applied to a first gate line GA, A2 shows a gate signal to be applied to a second gate line GA, and An shows a gate signal to be applied to a n-th gate line GA. Similarly, in FIG. 12, B1 shows a gate signal to be applied to a first gate line GB, B2 shows a gate signal to be applied to a second gate line GB, and Bn shows a gate signal to be applied to an n-th gate line GB. A data signal D corresponding to the gate line GA is applied to a data line DL (here, for simplification, all data lines are referred by the data line DL collectively) and the gate signals A1, A2, . . . are sequentially applied to n-pieces of gate lines GA and, as a result, the triangular pixels directed upward 7d corresponding to the gate lines GA are sequentially scanned (for every row). Then, data signal D corresponding to the gate line GB is applied to the data line DL and gate signals B1, B2, . . . Bn are applied to n-pieces of gate lines GB and, as a result, the triangular pixels directed downward 7e corresponding to the gate lines GB are sequentially scanned (for every row). By repeating procedures described above, all the screens are changed from time to time in a sequential scanning manner to display a moving image. It is natural that, by continuing to write the same data signal D, image display can be maintained and still images can be still displayed.

Next, operations by the second driving method of the example are explained by referring to FIG. 13. In the second driving method of the example, as shown in FIG. 13, a gate signal A1 is applied to the first gate signal GA and, then, a gate signal B1 is applied to the first gate line GB. Next, a gate signal A2 is applied repeatedly to the second gate line GA and then a gate signal B2 is applied repeatedly to the second gate line GB and a gate signal Bn is applied repeatedly to an n-th gate line GB. At the time, to the data line DL, the data signal D corresponding to the gate signal A1, data signal D corresponding to the gate signal B1, data signal D corresponding to the gate signal A2, data signal D corresponding to the gate signal B2, data signal D corresponding to the gate signal An, data signal D corresponding to the gate signal Bn are sequentially applied and scanning is performed while a changeover is being made between the signal corresponding to the gate line GA and the signal corresponding to the gate line GB. By repeating these processes, an entire screen is displayed.

Thus, according to the configuration in the example, the non-rectangular display area is formed by using a pixel unit of a triangle, thereby obtaining translation in three directions and the non-rectangular display device providing a further highly effective design result can be achieved (when compared with the display area of the second example configured by using a pixel unit of a parallelogram allowing translation in two directions only).

EXAMPLE 4

Figure 14:
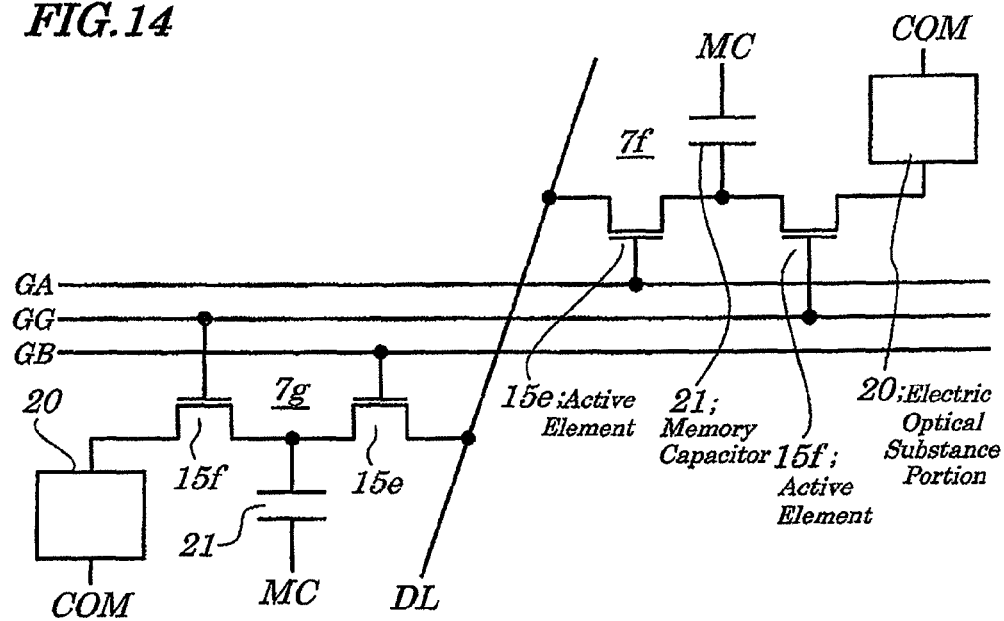
FIG. 14 is a diagram partially showing a circuit configuration of a display area (pixel array) of a fourth example of the present invention.
Figure 15:
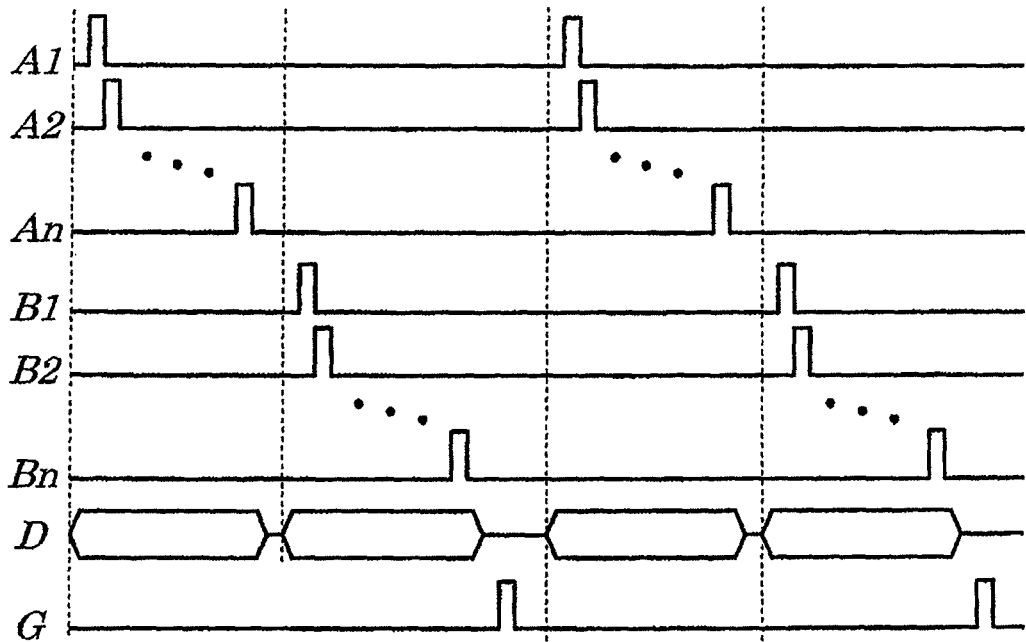
FIG. 15 is a timing chart provided to explain a driving method of the fourth example of the present invention.

FIG. 14 is a diagram partially showing a circuit configuration of a display area (pixel array) of a fourth example of the first exemplary embodiment of the present invention. FIG. 15 is a timing chart provided to explain a driving method of the fourth example. The configuration of arrangements of active elements in the display area (pixel array) of the fourth example is the same as that (third example) shown in FIG. 10. In the display area of the fourth example, the first conductor line shown in FIG. 3 plays a role of a gate line and the third conductor line plays a role of a data line. More specifically, in the wiring portion corresponding to the first conductor line shown in FIG. 3, three gate lines GA, GG, and GB are assigned in parallel to one another and, in the wiring portion corresponding to the third conductor line shown in FIG. 3, a data line DL is arranged. In the wiring portion corresponding to the second conductor line, a memory capacitance line MC is arranged. That is, three pieces of the gate lines GA, GG, and GB are shown as one piece of the first conductor line in FIG. 3. In the example, n-pieces ("n" is a natural number being less than 2) of each of the gate lines GA, GG, and GB are formed.

As shown in FIG. 14, each of the triangular pixel directed upward 7f and triangular pixel directed downward 7g is mainly made up of an active element 15e such as a TFT, a memory capacitor 21, an active element 15f such as a TFT, and an electric optical substance portion 20 substantially functioning as a pixel. The configuration of the fourth exemplary embodiment differs from that of the third exemplary embodiment in that memory elements (memory capacitor 21, active element 15f, and the like) are provided in every pixel. The gate electrode of the active element 15e, as shown in FIG. 14, is connected to the gate line GA (or GB) and its source electrode (or drain electrode) is connected to the data line DL and its drain electrode (source electrode) is connected to one end of the memory capacitor 21 and to the source electrode (drain electrode) of the active element 15f. The gate electrode of the active element 15f is connected to the gate line GG and its source electrode (or drain electrode) is connected to the active element 15e and its drain electrode (source electrode) is connected to one end of the electric optical substance portion 20. Another end of the memory capacitor 21 is connected to the memory capacitance line MC and another end of the electric optical substance portion 20 is connected to the common electrode line COM (on a facing electrode side). Moreover, after the electric optical substance is added to the electric optical substance portion 20, the storage capacitor 19 (whose another end is the storage capacitance line SC) may be connected to the electric optical substance portion 20. In this case, the memory capacitance line MC and storage capacitance line SC may be partially or totally used as a common line.

In the above configurations, in FIG. 14, the memory capacitor 21 of the triangular pixel directed upward 7f (upper right of FIG. 14) is controlled by a gate signal flowing through the gate line GA and the memory capacitor of the triangular pixel directed downward 7g (lower left of FIG. 14) is controlled by a gate signal flowing through the gate line GB. The connection between each memory capacitor 21 and electric optical substance portion 20 is controlled by a gate signal flowing through the gate line GG.

Next, operations of the example are described by referring to FIG. 15. In FIG. 15, A1 represents a gate signal to be applied to the first gate line GA, A2 represents a gate signal to be applied to the second gate line GA, and An represents a gate signal to be applied to the n-th gate line GA. Similarly, in FIG. 15, B1 represents a gate signal to be applied to the first gate line GB, B2 represents a gate signal to be applied to the second gate line GB, and Bn represents a gate signal to be applied to the n-th gate line GB.

Figure 16:
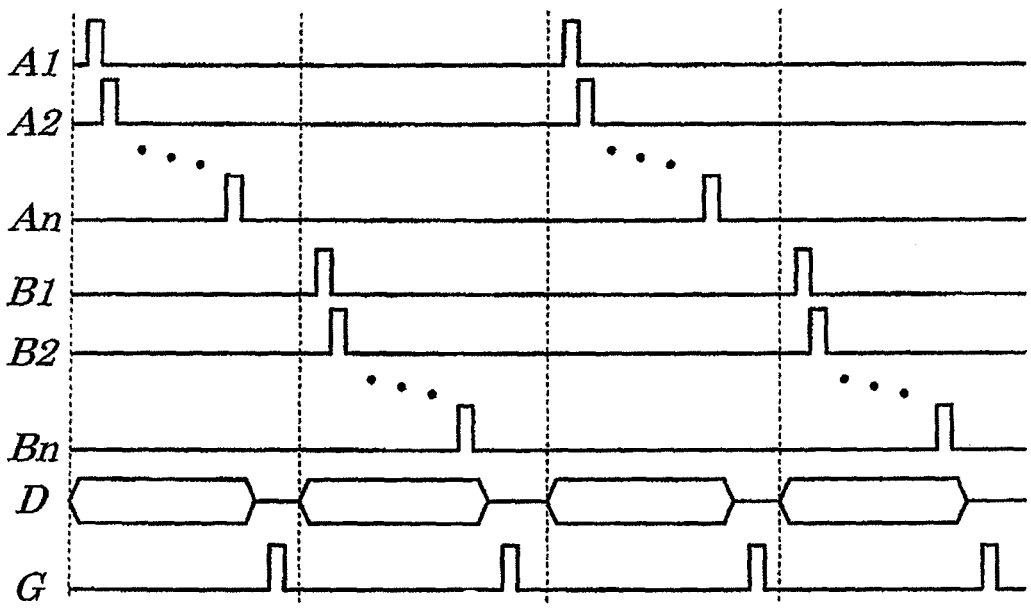
FIG. 16 is a timing chart provided to explain a driving method of the fourth example of the present invention.

Moreover, for simplification, all the gate lines GG are referred by the gate line GG collectively. A data signal D corresponding to the gate line GA is applied to a data line DL (here, for simplification, all data lines are referred by the data line DL collectively) and the gate signals A1, A2, . . . are sequentially applied to n-pieces of gate lines GA and, as a result, the triangular pixels directed upward 7f corresponding to the gate lines GA are sequentially scanned (for every row). Then, data signal D corresponding to the gate line GB is applied to the data line DL and gate signals B1, B2, . . . Bn are applied to n-pieces of gate lines GB and, as a result, the triangular pixels directed downward 7g corresponding to the gate lines GB are sequentially scanned (for every row). By repeating such processes described above, a voltage corresponding to a data signal D is stored to each memory capacitor 21. Then, when the signal G is simultaneously applied to all gate lines GG, the active element 15f is turned ON, which causes the data signal D stored in each memory capacitor 21 to be applied to the electric optical substance portion 20. Thus, in the fourth example (FIG. 15), the switching of display of an entire screen is performed simultaneously and, therefore, the driving method is called a "plane sequential driving method", while the driving method employed in the third example (FIGS. 12 and 13) is called a "line sequential driving method". Moreover, the method for applying a signal to the gate lines GA and GB, and data line DL used in the driving method shown in FIG. 15 is the same as the first driving method (FIG. 12) of the third example, however, the second driving method (FIG. 13) of the third example may be employed. Moreover, as shown in FIG. 16, another method may be used in which, after image data D corresponding to the gate line GA is written, a signal G is inputted into the gate line GG and further, after image data D corresponding to the gate line GB is written, the signal G is inputted to the gate line GG. By driving as above, data stored in the memory capacitor 21 is written twice to each of the pixels 7f and 7g and, therefore, operations of the electric optical substance portion 20 become more stable and, since the display frequency is doubled, the display becomes more clear.

As described as above, according to the fourth example, the non-rectangular display area is formed by using a pixel unit of a triangle and translation in three directions is obtained and approximately the same effect as described in the third example can be achieved. In addition, in the configuration of the fourth example, clear image display can be realized. For example, contrast is improved and display of moving image becomes better.

EXAMPLE 5

Figure 17:
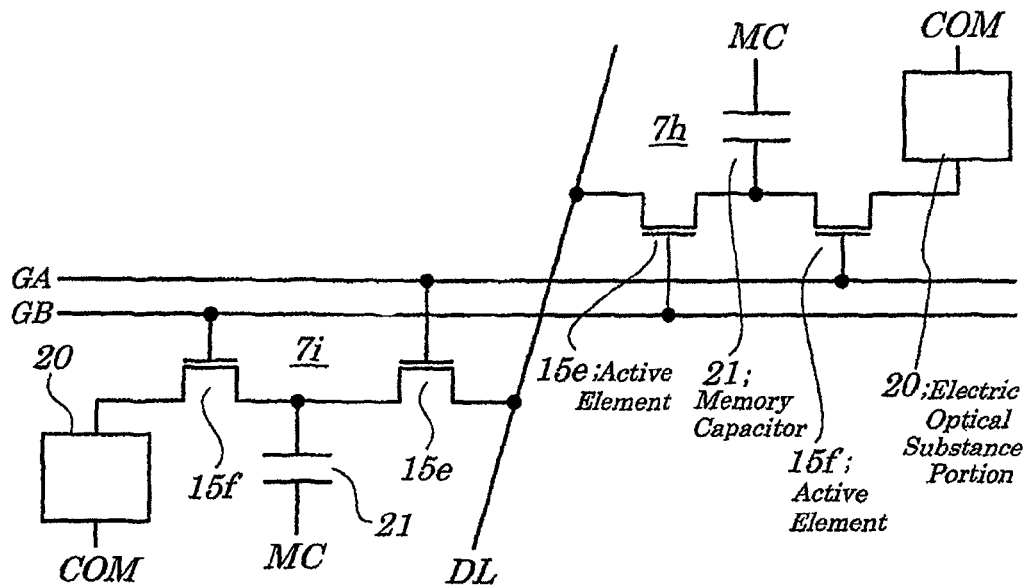
FIG. 17 is a diagram partially showing a circuit configuration of a display area (pixel array) of a fifth example of the present invention.
Figure 18:
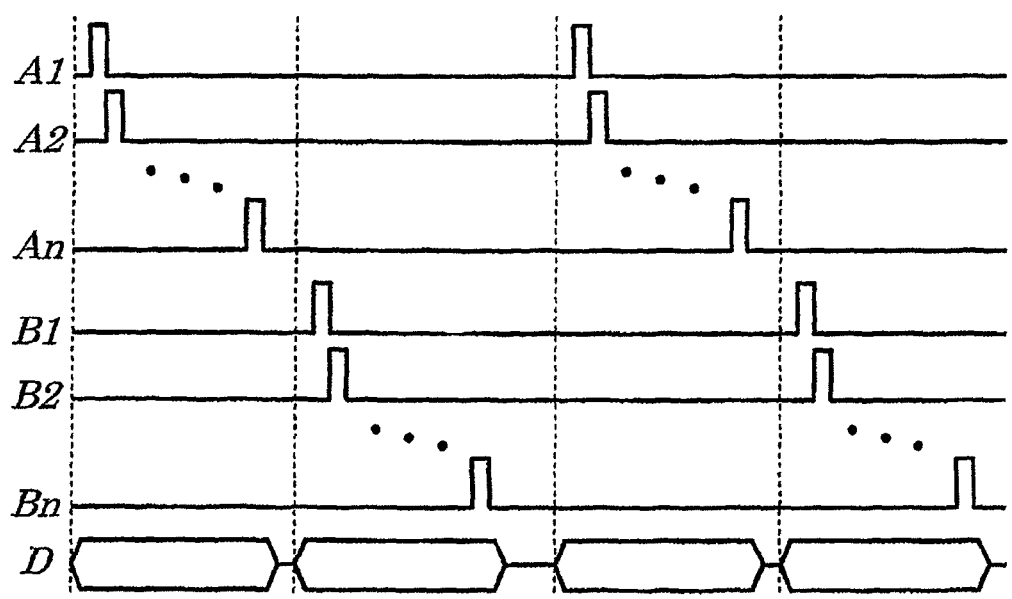
FIG. 18 is a timing chart provided to explain a driving method of the fifth example of the present invention.

FIG. 17 is a diagram partially showing a circuit configuration of a display area (pixel array) of a fifth example of the present invention. FIG. 18 is a timing chart provided to explain a driving method of the fifth example. In the wiring portion corresponding to the first conductor line shown in FIG. 3, two gate lines GA, GB are assigned in parallel to each other and, in the wiring portion corresponding to the third conductor line shown in FIG. 3, a data line DL is arranged. In the wiring portion corresponding to the second conductor line, a memory capacitance line MC is arranged. As shown in FIG. 17, each of the triangular pixels directed upward 7h and triangular pixel directed downward 7i is mainly made up of an active element 15e such as a TFT, a memory capacitor 21, an active element 15f such as a TFT, and an electric optical substance portion 20. Thus, the display area of the fifth example is the same as that of the fourth example in that the memory element is formed in every pixel, however, differs in that, in the connection configuration, the gate line GG is removed out of the three gate lines GA, GG, and GB.

That is, in the triangular pixel directed upward 7h (upper right of FIG. 17), a gate electrode of the active element 15e is connected to the gate line GB and the gate electrode of the active element 15f is connected to the gate line GA. In the triangular pixel directed downward 7i (lower left of FIG. 17), the gate electrode of the active element 15e is connected to the gate line GA and the gate electrode of the active element 15f is connected to the gate line GB.

In the above configuration, the memory capacitor 21 of the triangular pixel directed upward 7h (upper right of FIG. 17) is controlled by a gate signal flowing through the gate line GB and the connection between the memory capacitor 21 and electric optical substance 20 is controlled by a gate signal flowing through the gate line GA. Moreover, the memory capacitor 21 of the triangular pixel directed downward 7i (lower left of FIG. 17) is controlled by the gate signal flowing through the gate line GA and the connection between the memory capacitor 21 and electric optical substance 20 is controlled by the gate signal flowing through the gate line GB.

Next, operations of the example are described by referring to FIG. 18. First, in the state where attention is focused on the triangular pixel directed upward 7h (upper right pixel of FIG. 17), when gate signals A1, A2, . . . An are sequentially applied to the gate line GA, the gate electrode of the active element 15f is turned ON, thus causing the data signal D stored in the memory capacitor 21 to be applied to the electric optical substance 20. Next, when the gate signals B1, B2, . . . Bn are sequentially applied to the gate line GB, the gate electrode of the active element 15e is turned ON, causing the data signal D to be stored in the memory capacitor 21. Then, in the state where attention is focused on the triangular pixel directed downward 7h (lower left of FIG. 17), when gate signals B1, B2, . . . Bn are sequentially applied to the gate line GB, the gate electrode of the active element 15f is turned ON, thus causing the data signal D stored in the memory capacitor 21 to be stored in data capacitor 21. When gate signals A1, A2, . . . An are sequentially applied to the gate line GA, the gate electrode of the active element 15e is turned ON, thus causing the data signal D stored in the memory capacitor 21 to be stored in the electric optical substance 20. In both the pixels, the data signal D is stored in the memory capacitor 21 by one gate signal D and the data signal D is applied by another gate signal to the electric optical substance 20.

As described as above, according to the fifth example, the non-rectangular display area is formed by using a pixel unit of a triangle and translation in three directions is obtained and approximately the same effect as described in the third example can be achieved. In addition, in the configuration of the fifth example, the number of gate lines can be reduced when compared with the fourth case (FIG. 14).

EXAMPLE 6

Figure 19:
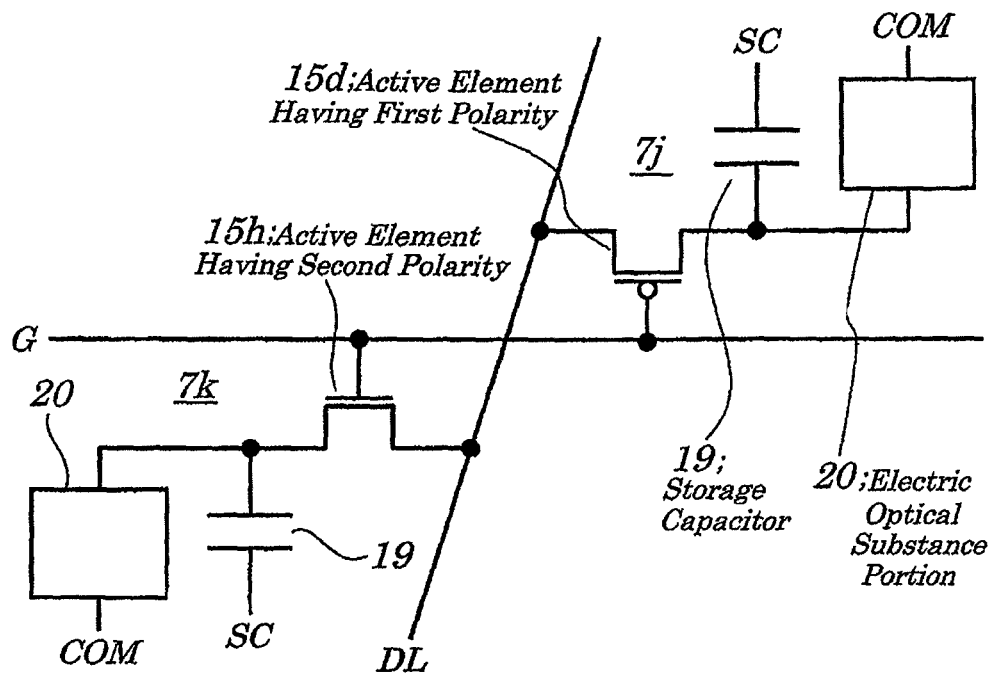
FIG. 19 is a diagram partially showing a circuit configuration of a display area (pixel array) of a sixth example of the present invention.
Figure 20:
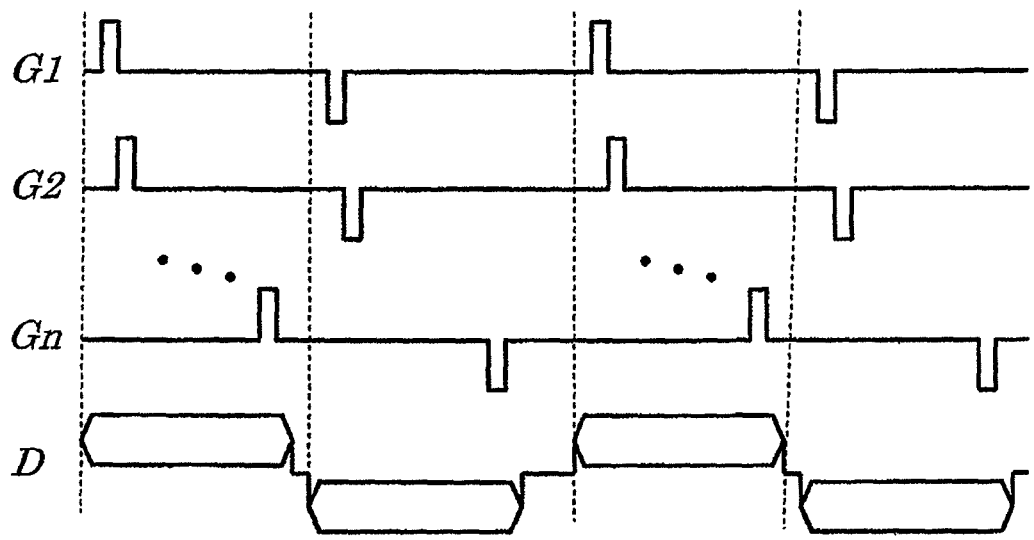
FIG. 20 is a timing chart provided to explain a driving method of the sixth example of the present invention.

FIG. 19 is a diagram partially showing a circuit configuration of a display area (pixel array) of a sixth example of the present invention. FIG. 20 is a timing chart provided to explain a driving method of the sixth example. In the display area of the sixth example, the first conductor line shown in FIG. 3 plays a role of a gate line G and the third conductor line plays a role of a data line DL, the second conductor line plays a role of the storage capacitance line SC and common electrode line COM. As described in the above examples, the storage capacitance line SC and common electrode line COM may be arranged as two different lines independently or as a single common line.

In the sixth example 6, the triangular pixel directed upward 7j (upper right of FIG. 19) is mainly made up of an active element 15g having a first polarity (in the example, as a P-channel type), a storage capacitor 19, and electric optical substance potion 20. The triangular pixel directed downward 7k (lower left of FIG. 19) is mainly made up of an active element 15h having a second polarity (in the example, as an N-channel type), a storage capacitor 19, and electric optical substance portion 20. Moreover, it is needless to say that the triangular pixel directed upward 7j (upper right of FIG. 19) may be made up of the active element having the second polarity. The triangular pixel directed downward 7k (lower left of FIG. 19) may be made up of the active element having the first polarity. In the triangular pixel directed upward 7j (upper right of FIG. 19), the active element 15g having the first polarity is connected to the gate line G, data line DL, storage capacitor 19, and electric optical substance portion 20. In the triangular pixel directed downward 7k (lower left of FIG. 19), the active element 15h having the second polarity is connected to the gate line G, data line DL, storage capacitor 19, and electric optical substance portion 20.

Next, operations of the sixth example are described by referring to FIG. 20. In FIG. 20, G1 represents a gate signal to be applied to the first gate line G, G2 represents a gate signal to be applied to the second gate line G, and Gn represents a gate signal to be applied to the n-th gate line G. In the example, a "positive" pulse signal (gate signal) whose potential is higher than a reference potential of the gate line G and a "negative" pulse signal (gate signal) whose potential is lower than the reference potential of the gate line G are applied alternately (in a field period) with a reference potential sandwiched therebetween to each gate line G. Moreover, the polarity of the data signal D varies depending on the polarity of the pulse signal (gate signal).

In the above configuration, in a field period, when the positive pulse signal is applied to the gate line G, the active element 15h having the second polarity is turned ON, the data signal D of the data line DL is applied to the electric optical substance portion 20 of the triangular pixel directed downward 7k (lower left of FIG. 20). In a subsequent field period, when the negative pulse signal is applied to the gate line G, the active element 15g having the first polarity is turned ON, the data signal D of the data line DL is applied to the electric optical substance portion 20 of the triangular pixel directed upward 7j (upper left of FIG. 20).

Thus, according to the sixth example, by applying a gate signal having polarities different from one another, the entire display area can be driven as a whole, thereby reducing the number of wirings for the gate line.

EXAMPLE 7

Figure 21:
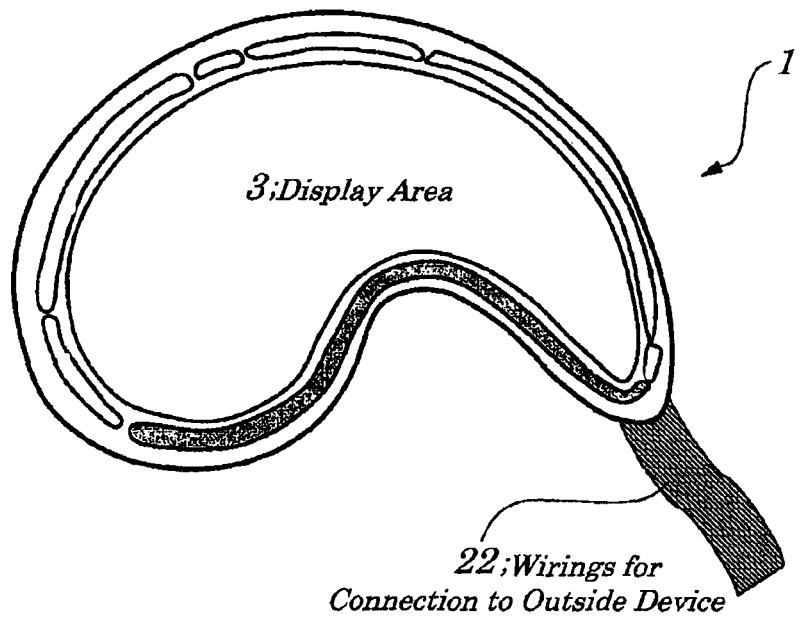
FIG. 21 is a front view diagrammatically showing a configuration of a non-rectangular display device of the seventh example of the present invention.

FIG. 21 is a front view diagrammatically showing configurations of a non-rectangular display device of the seventh example of the present invention. The non-rectangular display device 1 of the seventh example has the same configuration as the display device of the first example shown in FIG. 1, however, in the seventh example, a connection wiring 22 to connect the display area 3 to the outside device (lower right of FIG. 21). Here, by providing the peripheral circuit with a required function to drive various types of conduction line group, the number of terminals required for the connection wiring 22 can be reduced. If the number of terminals can be successfully reduced, as shown in FIG. 21, similarity between the outer shape of the display device 1 of FIG. 1 and the contour of the display device 1 is not lost, whereby attractive appearance of the display 1 can be maintained.

Modified Example 1

Figure 22:
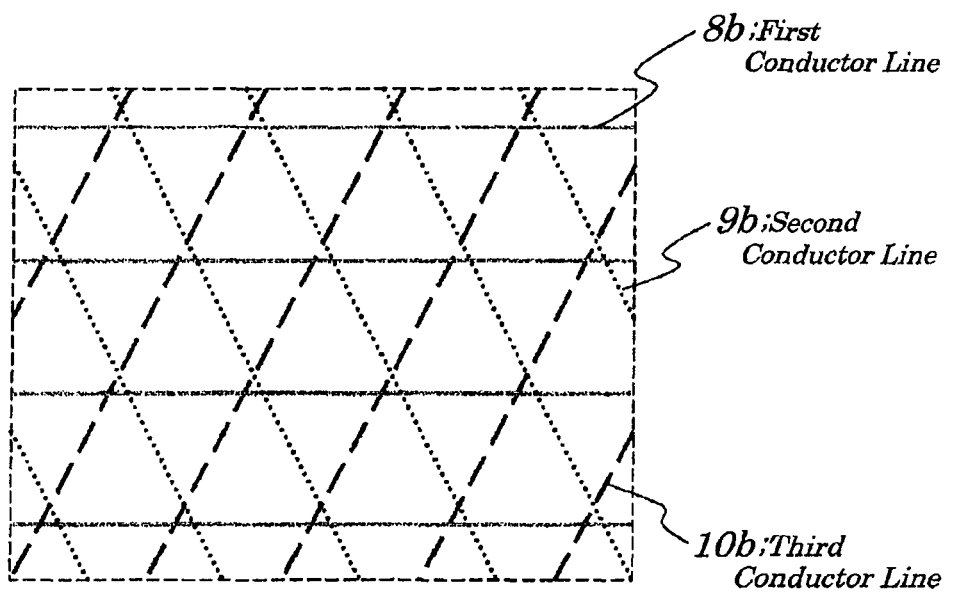
FIG. 22 is an enlarged diagram schematically showing, in a partially enlarged manner, a display area of a modified example of the first exemplary embodiment of the present invention.

FIG. 22 is an enlarged diagram schematically showing, in a partially enlarged manner, a display area (pixel array) being a modified example of the first exemplary embodiment of the present invention. The display area of the modified example differs from that shown in FIG. 3 in that, unlike the case where the given first, second, and third conductor lines 8, 9, 10, . . . , intersect with one another at one point as shown in FIG. 3, in FIG. 22, there is no intersection of these lines at one point. That is, in the modified example, the intersection between the first conductor line 8b and second conductor line 9b, the intersection between the second conductor line 9b and third conductor line 10b, the intersection between the third conductor line 10b and first conductor line 8b, do not overlap with one another at one point. According to the configuration of the modified example, though an aperture area of each pixel becomes somewhat smaller, a difference in level among multilayer wirings at the intersection area can be more reduced when compared with the case where the three conductor lines intersect with one another at one point. Owing to this, a wiring failure (line breakage or short circuit) being liable to occur in the level difference portion can be reduced.

Second Exemplary Embodiment

Figure 23:
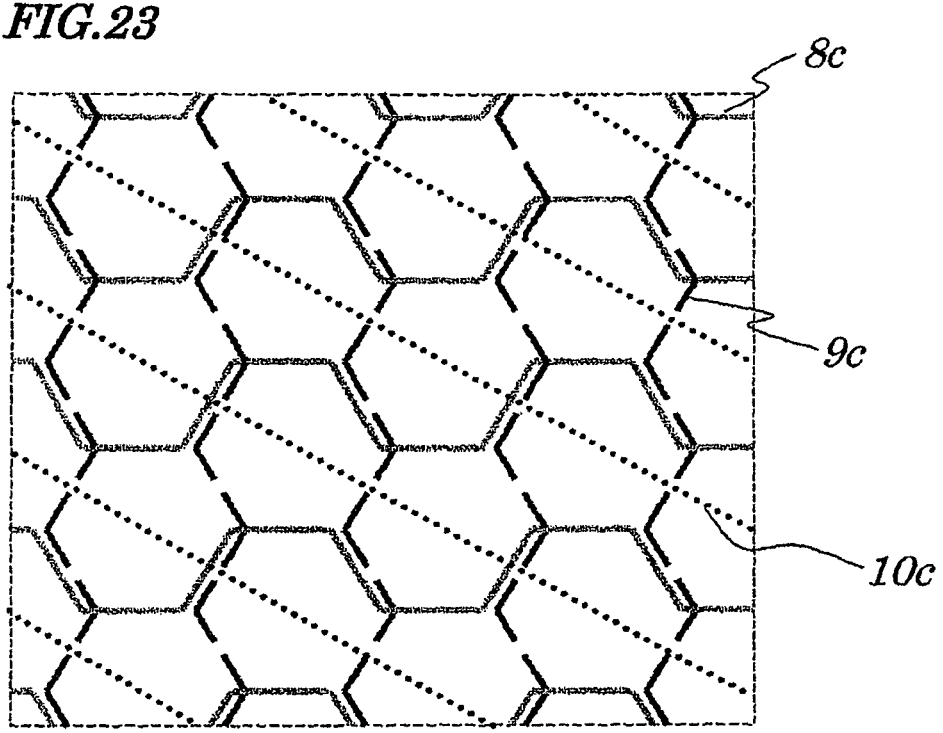
FIG. 23 is an enlarged diagram schematically showing, in a partially enlarged manner, a display area making up a non-rectangular display device according to a second exemplary embodiment of the present invention.

Next, the second exemplary embodiment of the present invention is described by referring to FIG. 23. FIG. 23 is an enlarged diagram schematically showing, in a partially enlarged manner, a display area making up a non-rectangular display device of a second exemplary embodiment of the present invention. The display area of the second exemplary embodiment differs greatly from that of the first exemplary embodiment in that, instead of the triangular pixel, hexagonal pixels are employed.

In the display area (pixel array) of the second exemplary embodiment, many first conductor line groups each made up of a plurality of zigzag first conductor lines 8c, 8c, . . . , arranged in right and left directions in FIG. 23, many second conductor line groups each made up of a plurality of zigzag second conductor lines 9c, 9c, . . . , arranged in up and down directions, and many third conductor line groups each made up of a plurality of approximately line-like third conductor lines 10c, 10c, . . . , arranged in a slanted direction (upper left to lower right of FIG. 23) formed on a substrate and each of the first, second, and third conductor lines 8c, 9c, 10c, . . . , is connected to each corresponding pixel (active element), pixel electrode, and the like.

The above first conductor lines 8c, 8c, . . . , are so configured as to correspond to three sides out of six sides making up the hexagon and to be arranged in a warped zigzag manner. The second conductor lines 9c, 9c, . . . , are so configured as to correspond to two sides out of six sides making up the hexagon and to be arranged in a warped zigzag manner. That is, both the two first conductor lines 8c and 8c adjacent to each other and the two second conductor lines 9c and 9c adjacent to each other make up the hexagonal pixel. In the second exemplary embodiment, the first conductor line 8c, second conductor line 9c, and third conductor line 10c intersect, for every pixel, in other words, intersect with one another in a portion corresponding to an outer circumferential portion of the hexagon forming the pixel.

Figure 24:
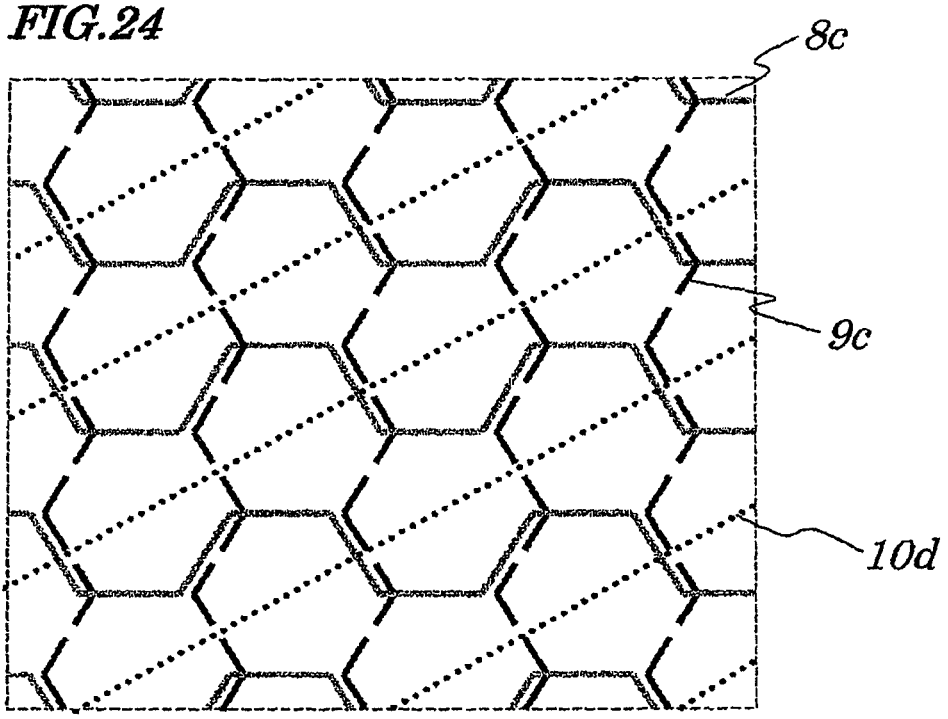
FIG. 24 is an enlarged diagram schematically showing, in a partially enlarged manner, various kinds of wiring patterns in the display area making up the non-rectangular display device according to the second exemplary embodiment of the present invention.
Figure 25:
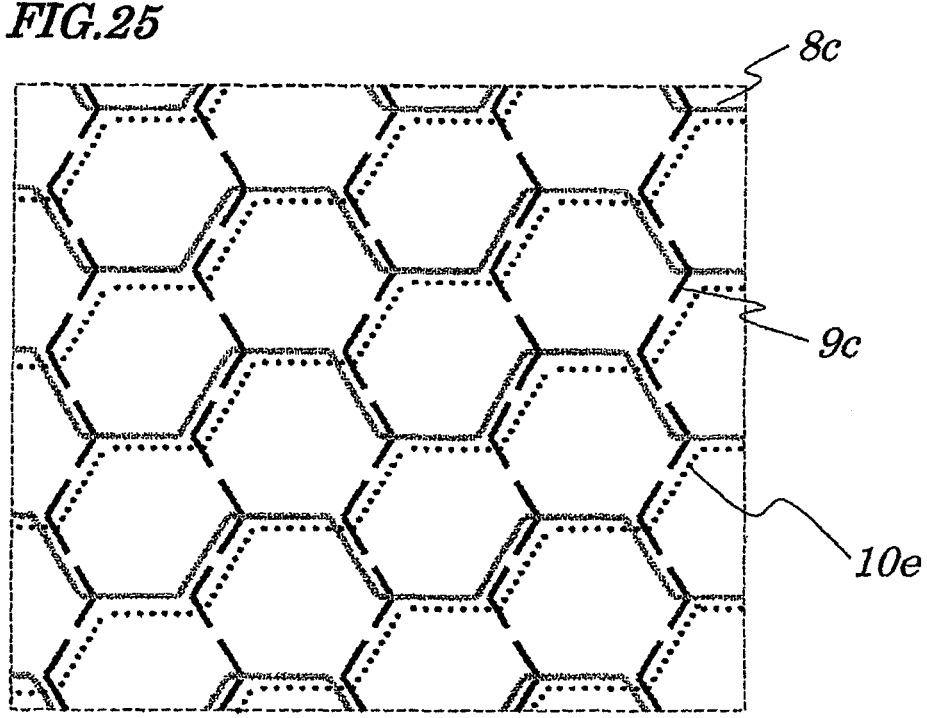
FIG. 25 is an enlarged diagram schematically showing, in a partially enlarged manner, various kinds of wiring patterns in the display area making up the non-rectangular display device according to the second exemplary embodiment of the present invention.

Moreover, in FIG. 23, the third conductor lines 10c, 10c, . . . , extend in an approximately line-like manner in a left upward direction of FIG. 23, however, as shown in FIG. 24, third conductor lines 10d, 10d, . . . , may extend in an approximately line-like manner in a right downward direction of FIG. 24. The third conductor lines 10c (10d), 10c(10d), . . . , may be arranged at a given inclined angle. Further, as shown in FIG. 25, the third conductor lines 10e, 10e, . . . , may be arranged in a manner to produce an outer circumferential shape of the hexagonal pixel and may extend in a warped zigzag manner in a slanted direction.

The hexagonal pixel made up of only two kinds of conductor lines (first and second conductor lines) has a problem in that, since the number of free directions in which a repetition unit is allowed to be designed to be freely expanded or contracted is only two (from a broad view, up and down directions, and right and left directions), the improvement of attractive appearance of an outer shape of the non-rectangular display area is restricted and peripheral circuits cannot be mounted in a good manner. However, according to the second exemplary embodiment, besides the repetition in up and down directions, the repetition in the slanted direction is added (thus, increasing the free directions) and, therefore, matching between the repetition unit and the outer shape of the non-rectangular display area can be improved. Thus, even when the third conductor lines are arranged, the peripheral circuits can be mounted in a good manner. As a result, the appearance beauty of the display area and display device can be improved.

Third Exemplary Embodiment

Figure 26:
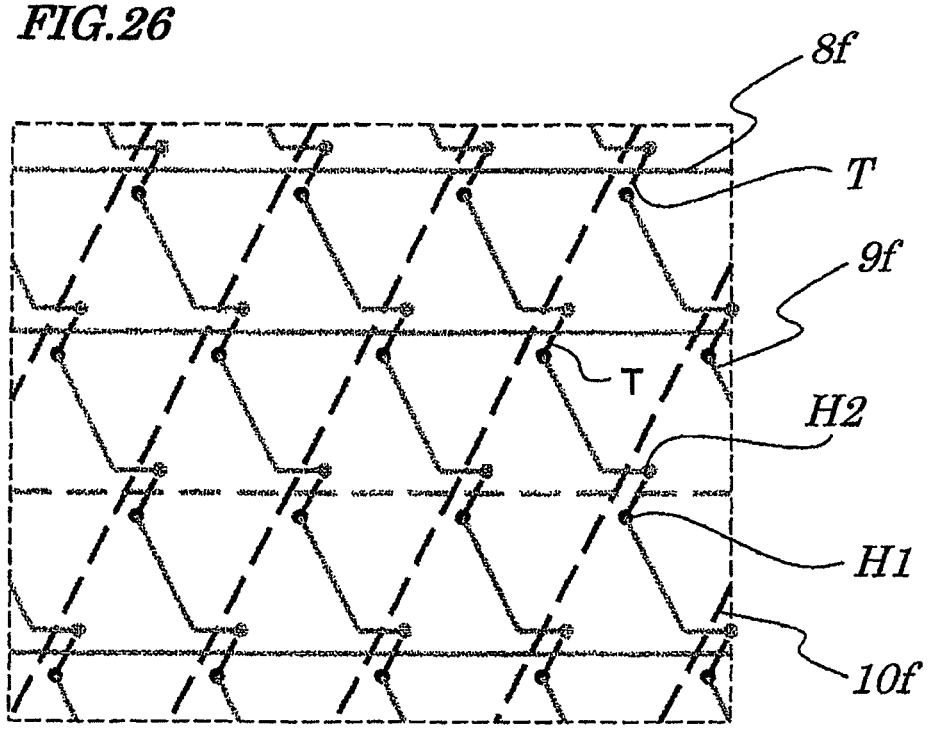
FIG. 26 is an enlarged diagram schematically showing, in a partially enlarged manner, various kinds of wiring patterns in a display area making up a non-rectangular display device according to a third exemplary embodiment of the present invention.

Next, the third exemplary embodiment of the present invention is described by referring to FIG. 26. FIG. 26 is an enlarged diagram schematically showing, in a partially enlarged manner, various kinds of wiring patterns in a display area making up a non-rectangular display device of the third exemplary embodiment of the present invention. The configuration of the display area of the third exemplary embodiment is approximately the same as that of the first exemplary embodiment in that the display area is made up of triangular pixels, however, differs in that a three-dimensional bypass intersection structure in which contacts are used for connection among wiring layers are employed.

According to the third exemplary embodiment, a display area (pixel array) is configured as a multilayer wiring structure made up of an intermediate insulating layer (not shown) and of first and second wiring layers (not shown) stacked in layers with the intermediate insulating layer interposed therebetween and, in the first wiring layer, the entire first conductor line 8f and main portion (not intersected region) of a second conductor line 9f are formed and, in the second wiring layer, the entire third conductor line 10f and non-main portion (intersected region) are formed. On an interlayer insulating layer, contacts H1 and H2 are formed, which connect the main portion (non-intersected portion) of the second conductor line group formed in the first wiring layer to the non-main portion (intersected portion) of the second conductor line group formed in the second wiring layer. The contacts H1 and H2 may be mounted in the vicinity of the intersection point between the first conductor line 8f and third conductor line 10f. Moreover, in the third exemplary embodiment, it is needless to say that the second conductor lines 9f are intersected by using the bypass, however, the present invention is not limited to this and the first conductor line 8f or the third conductor line 10f may be intersected with each other by using a bypass.

The first conductor lines 8f of the first conductor line group are arranged in right and left directions of FIG. 26 and the main portion (non-intersected portion) of the second conductor lines 9f belonging to the second conductor line group are arranged along a left upward direction of FIG. 26. The third conductor lines 10f belonging to the third group are arranged along the right upward direction. Moreover, the non-main portion (intersected region T) of the second conductor line 9f is formed so as to have a length being short enough to straddle the first conductor line 8f, toward a direction in which the second conductor line 9f does not contact with the third conductor line 10f in the same wiring layer. The dimension, shape, and direction of the wiring of the non-main portion (intersected region T) of the second conductor line 9f are determined in a given manner by taking conditions of manufacturing processes and/or designing into consideration. Thus, in the third exemplary embodiment, in the region where the first conductor line 8f intersects the second conductor line 9f in the wiring layer, in order to avoid a collision between conductor lines, the second conductor line 9f is folded back through the contact H1 and, after having passed the intersected region through a bypass, again is folded back through the contact H2 toward the original first wiring layer.

Unlike the first exemplary embodiment in which the multilayer wiring films having three structures are required to perform wiring of various conductor lines intersecting with one another, according to the third exemplary embodiment, two layer structure is enough, which enables the reduction of the number of wirings and wiring materials.

Fourth Exemplary Embodiment

Figure 27:
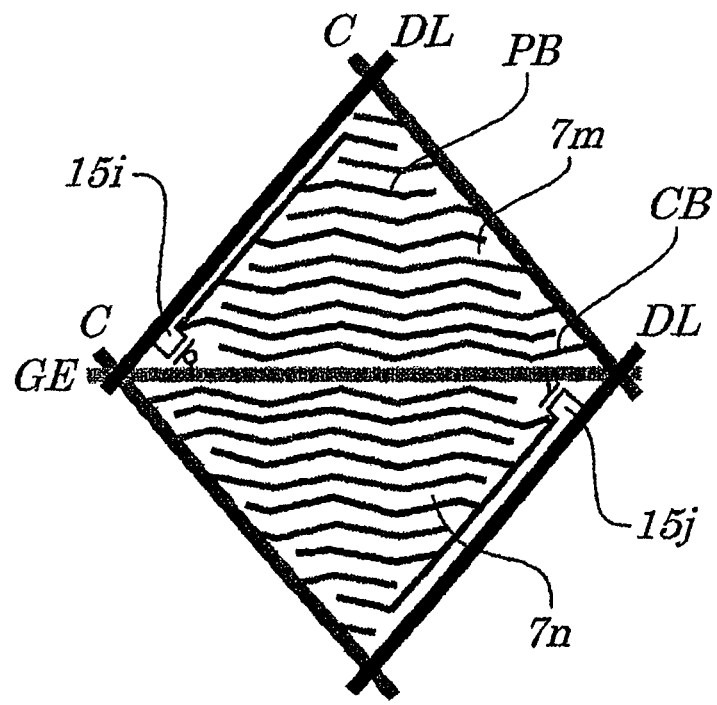
FIG. 27 is a wiring diagram showing wirings surrounding pixels making up a display area of an IPS (In-Plane Switching) liquid crystal display device according to a fourth exemplary embodiment of the present invention.

Next, a fourth exemplary embodiment of the present invention is described by referring to FIG. 27. The display device of the fourth exemplary embodiment is the same as that in the above exemplary embodiments in that non-rectangular pixels are used, however, differs in that a common electrode (therefore, common electrode line) is placed not on a facing substrate but on a substrate on an active element side. An example of the display device of this kind is an IPS (In-Plane Switching) liquid crystal display device configured to be operated by an electric field in a direction being parallel to a substrate surface.

FIG. 27 is a wiring diagram showing wirings surrounding pixels making up the display area of the IPS liquid crystal display device of the fourth exemplary embodiment of the present invention. In the display device having such configurations, two types of pixels including a triangular pixel directed upward 7m and a triangular pixel directed downward 7n are mounted and, as shown in FIG. 27, the triangular pixel directed upward 7m and triangular pixel directed downward 7n are driven respectively by active elements 15i and 15j having polarities being different from each other. The active elements 15i and 15j are arranged in accordance with the arrangement in FIG. 19. That is, the triangular pixel directed upward 7m is driven by the active element 15i having the first polarity (in this configuration, as a P-channel type) and the triangular pixel directed downward 7n is driven by the active element 15j having the second polarity (in this configuration, as an N-channel type).

In the display area of the fourth exemplary embodiment, each of the triangular pixel directed upward 7m and triangular pixel directed downward 7n is surrounded by a gate line GE (first conductor line), common electrode line C (second conductor line), and data line DL (third conductor line), each forming a triangle. In each pixel, the common electrode line C is branched like the branch of a tree to form a comb-shaped common electrode CB, which is placed so as to face a comb-shaped pixel electrode PB in an engaged and paired manner. In such configurations as above, a data signal on the data line DL is applied to a pixel electrode in a pixel through the active elements 15i and 15j according to a signal on the gate line GE (in accordance with the time chart in FIG. 20). The same potential is applied to each common electrode line C. An electric field is generated between the comb-shaped pixel electrode PB and comb-shaped common electrode CB and images are displayed by operating a liquid crystal molecular substance (electric optical substance) using a horizontal electric field. Thus, in the fourth exemplary embodiment, approximately the same effect as in the first exemplary embodiment can be obtained.

Figure 28:
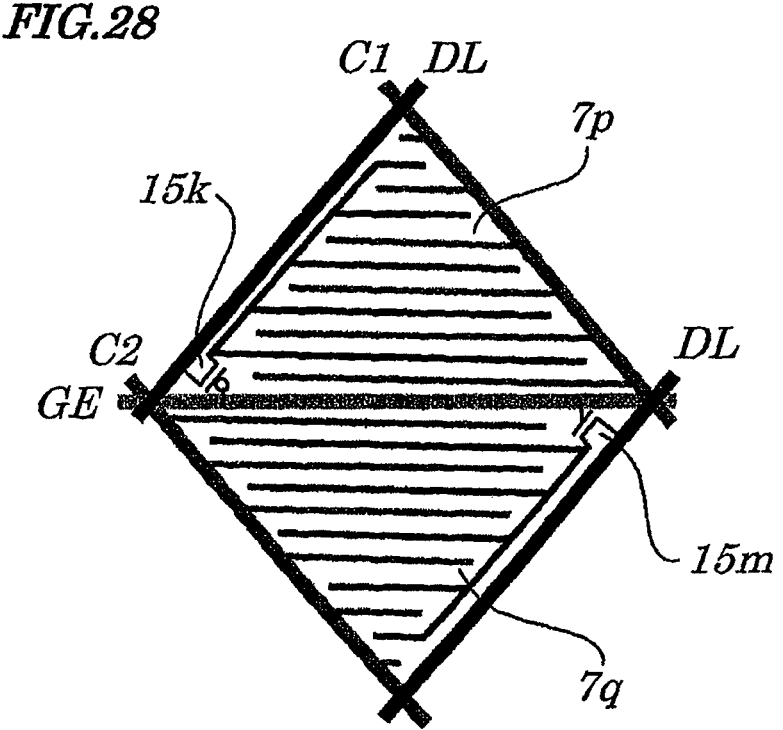
FIG. 28 is a wiring diagram showing wirings surrounding pixels making up the display area of the IPS display device according to the fourth exemplary embodiment of the present invention.
Figure 29:
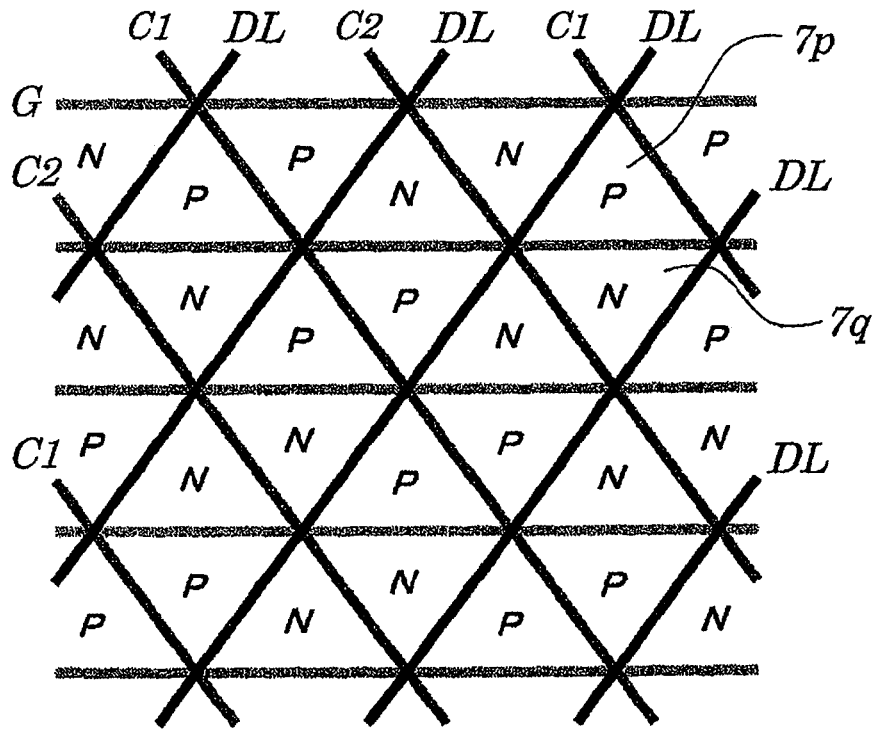
FIG. 29 is a diagram showing distribution of polarity of an active element in the display area making up the display area of the IPS display device of the fourth exemplary embodiment according to the present invention.

FIG. 27 shows the case where same potentials are applied to each common electrode line C, however, as shown in FIGS. 28 and 29, a first common electrode C1 and second common electrode C2, each receiving potentials being different from each other may be arranged alternately. In the arrangement of common electrode lines as above, for example, electrode potentials being different from one another can be applied according to the polarity of each of the active elements 15$k$ and 15$m$. That is, as shown in FIG. 29, the active element 15$k$ corresponding to the common electrode line C1 has the first polarity P and the active element 15$m$ corresponding to the common electrode line C2 has the second polarity N. Therefore, common electrode potentials corresponding to polarity of the active element can be applied to each pixel 7$p$ and 7$q$.

According to the display device of the fourth exemplary embodiment, all the first, second, and third conductor line groups are formed on the substrate on the active element side and, therefore, the display device can be applied to a display device essentially not requiring a facing substrate, for example, can be suitably applied to a non-rectangular organic EL (electroluminescent display device). In the above description, the IPS liquid crystal display device is used as the example, however, the display device of the fourth exemplary embodiment can be applied to other display devices in which the first, second, and third conductor line groups are formed on the substrate on the active element side. Therefore, the display device of the fourth exemplary embodiment can be suitably used in a liquid crystal display device of, for example, a FFS (Fringe Field Switching) mode. In the IPS mode display device, ordinarily, the common electrode CB and pixel electrode PB are formed on a layer having a same cross-sectional height and, due to this, it is necessary that, for example, a contact is mounted between the common electrode line C and common electrode CB to adjust the height. In many cases, by mounting the contact with the active element 15$i$ interposed between the data line DL and pixel electrode PB, no increase in size of the contact occurs. On the other hand, in the FFS mode display device, each of the common electrode CB and pixel electrode PB is formed in layers different from each other. Owing to this, the common electrode CB exists downward in a cross-sectional direction and the present invention is carried out irrespective of the structure of the contact.

Fifth Exemplary Embodiment

Figure 30:
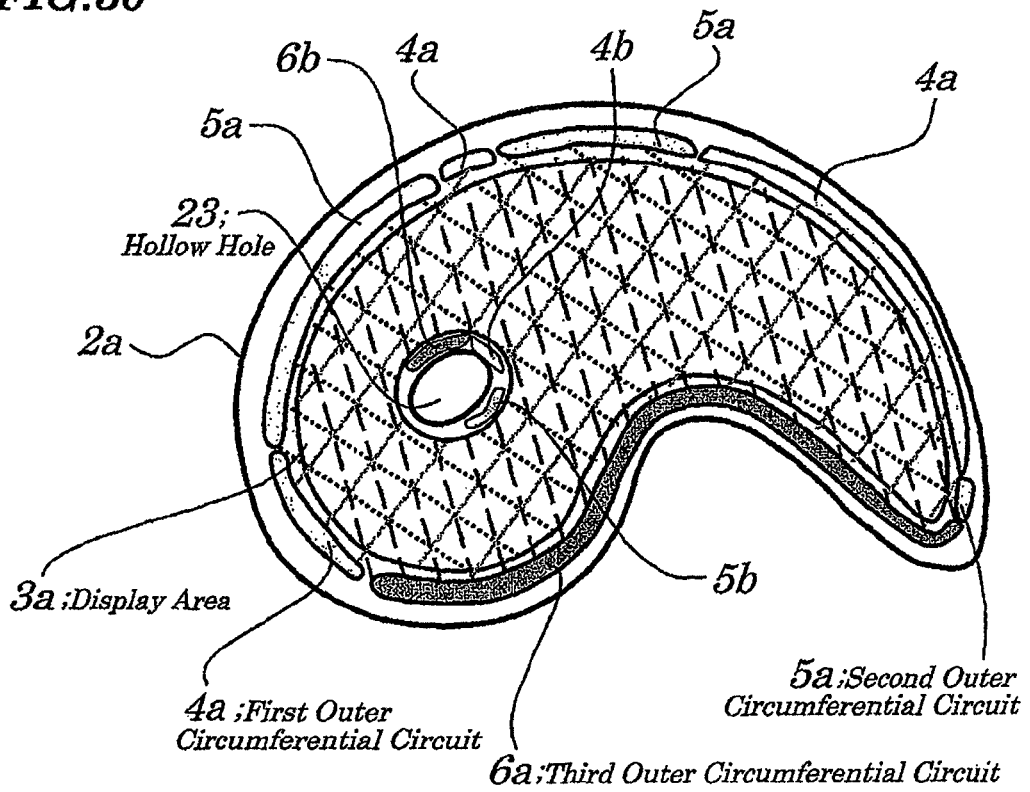
FIG. 30 is a front view diagrammatically showing a structure of a non-rectangular display device according to a fifth exemplary embodiment of the present invention.

FIG. 30 is a front view diagrammatically showing a structure of a non-rectangular display device of the fifth exemplary embodiment of the present invention. The outer shape of a display area 3$a$ of the non-rectangular display device 1$a$ of the fifth exemplary embodiment is the same as that of the first exemplary embodiment shown in FIG. 2 in that the display area has a comma-shaped-bead-like shape, however, differs from the first exemplary embodiment in that a hollow hole (as a through hole portion) 23 is formed in the comma-shaped-bead-like display area.

In the fifth exemplary embodiment, there are conductor lines which are interrupted due to the existence of the hollow hole 23. To achieve complete driving of various kinds of conductor line group, in the fifth exemplary embodiment, not only in the outer circumferential region of on a substrate 2$a$ but also in the inner circumferential region (circumferential region of the hollow hole 23), peripheral circuits are mounted.

That is, all first conductor lines in the display area 3$a$ are connected by a first peripheral circuit (first outer circumferential circuit 4$a$) in an outer circumferential region and a first peripheral circuit (first circumferential circuit 4$b$) in an inner circumferential region. All second conductor lines in the display area 3$a$ are connected by a second peripheral circuit (second outer circumferential circuit 5$a$) in the outer circumferential region and a second peripheral circuit (second circumferential circuit 5$b$) in the inner circumferential region. All third conductor lines in the display area 3$a$ are connected by a third peripheral circuit (third outer circumferential circuit 6$a$) in the outer circumferential region and a third peripheral circuit (third circumferential circuit 6$b$) in the inner circumferential region. Continuity of signals among the outer circumferential circuits 4$a$, 5$a$, and 6$a$ and inner circumferential circuits 4$b$, 5$b$, and 6$b$ are maintained through connection wirings (not shown) to connect these circuits.

Figure 31:
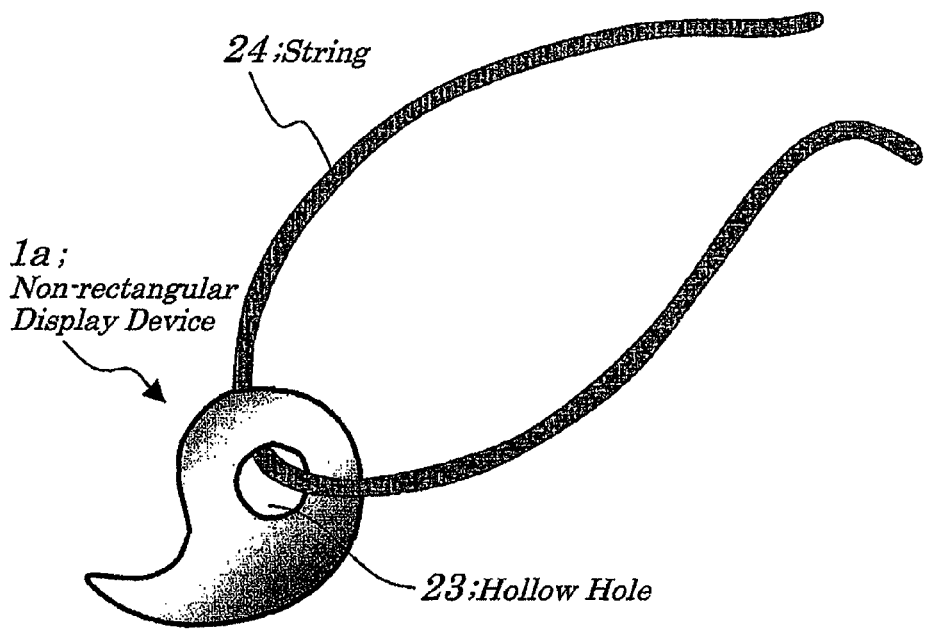
FIG. 31 is a diagram showing one example of applications of the non-rectangular display device according to the fifth exemplary embodiment of the present invention.

According to the fifth exemplary embodiment, by forming the hollow hole 23 in the display area 3$a$, a design-oriented display device providing surprisingness, extravagantness, and aesthetic appreciation can be obtained. From a viewpoint of technology, the display device can be suitably applied to various applications. In addition, as shown in FIG. 31, a string may be drawn through the hollow hole 23 for applications. Moreover, the hollow hole 23 may have a shape of a perfect circle, ellipse, triangle, rectangle, and polygon, and other various shapes (including Jordan shape) or a topographical pattern. The number of hollow holes 23 may be not only single but also plural; in other words, an n-fold Jordan region ("n" is a natural number) may be formed. A circular display device in which the size of the hollow hole 23 is larger than the display area may be formed. The approximately same effect as described above can be obtained by forming a non-display area, instead of the hollow hole.

In addition, in the case of the display device of this kind having a non-rectangular non-display region, an outer circumferential shape of the display area may be rectangular.

Sixth Exemplary Embodiment

Figure 32:
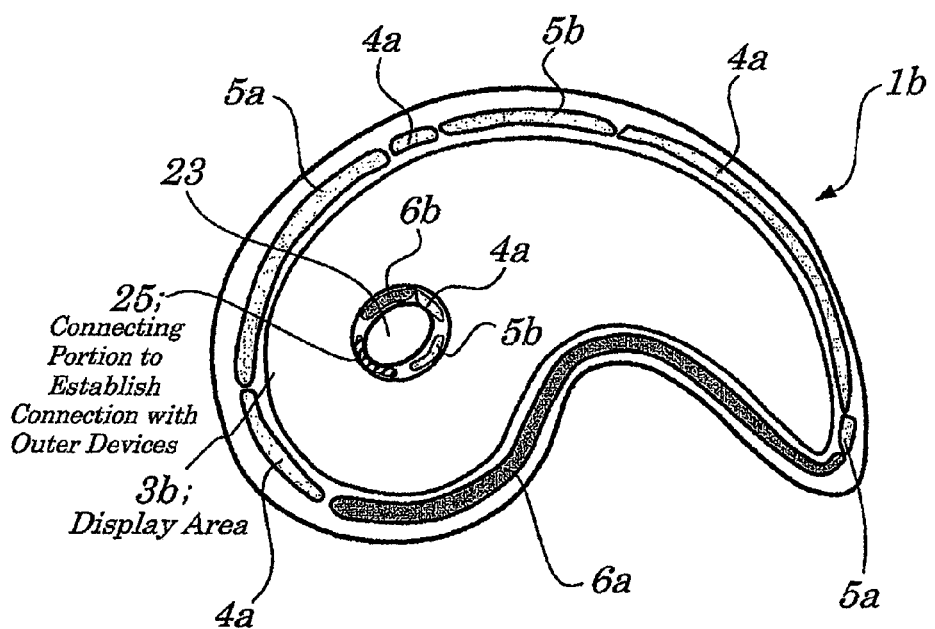
FIG. 32 is a front view diagrammatically showing a configuration of a non-rectangular display device according to a sixth exemplary embodiment of the present invention.

FIG. 32 is a front view diagrammatically showing a configuration of a non-rectangular display device of a sixth exemplary embodiment of the present invention. In the non-rectangular display device 1$b$ of the sixth exemplary embodiment, in the vicinity (non-display area) of the hollow hole 23 of the display device 1 of the fifth exemplary embodiment (FIG. 30) is added a connecting portion 25 to connect outer devices to wirings. Thus, according to the sixth exemplary embodiment, by drawing a string 24 (FIG. 31) through the hollow hole 23 and drawing a signal line through the string 23, the display device 1$b$ can be connected using the connecting portion 25 formed in the vicinity of the hollow hole 23 and, therefore, the connecting portion 25 and/or signal line are inconspicuous or the connecting portion 25 is recognizable in appearance, which enables the non-rectangular display device 1$b$ having a highly effective design result to be realized.

Seventh Exemplary Embodiment

The display device (not shown) of the seventh exemplary embodiment of the present invention is so configured as to transmit or receive signals wirelessly, instead of the use of the connecting portion 25 (FIG. 32) of the display device of the sixth exemplary embodiment to establish connection through wire with the outer devices. In the seventh exemplary embodiment, a signal transmitting portion to transmit and receive signals to and from the outer device wirelessly, or power supply portion to supply power wirelessly may be mounted in a position of the connecting portion 25 shown in FIG. 32, instead of the connecting portion 25. By configuring as above, there is no need for taking wirings to establish connection with the string 24 (FIG. 31) into consideration, which further increases design freedom and, therefore, a display device having high similarity between the outer shape of the display device and outer shape of the display area can be obtained. For example, a pendant-shaped display device allowing the movement of a pendant and/or a highly design-oriented display device can be achieved. Moreover, according to the display device of the seventh exemplary embodiment, by mounting an antenna section on a rear of the display device, its miniaturization can be achieved.

Eighth Exemplary Embodiment

Figure 33:
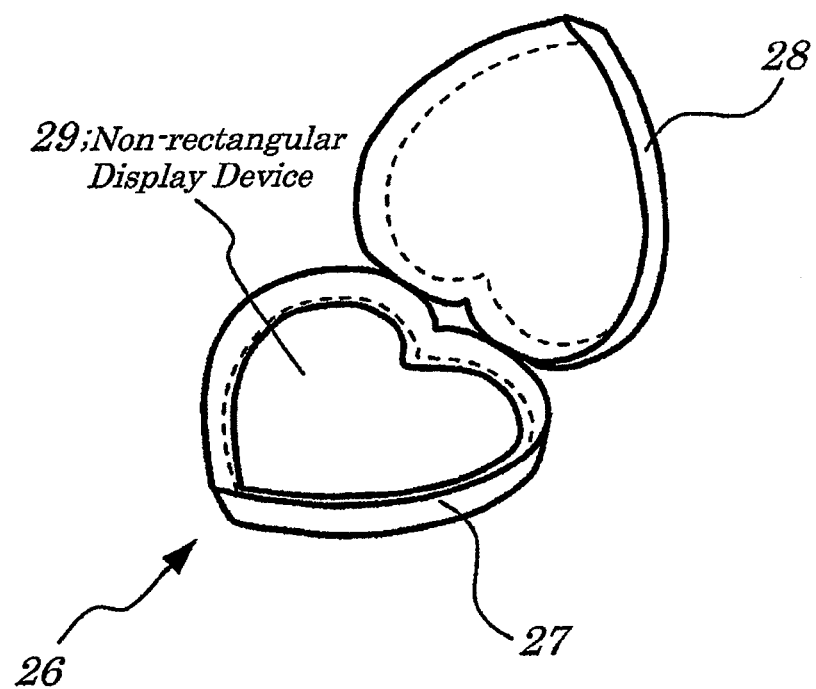
FIG. 33 is a perspective view showing an appearance of a decorative device in which a non-rectangular display device is embedded according to an eighth exemplary embodiment of the present invention.

FIG. 33 is a perspective view showing an appearance of a decorative device in which a non-rectangular display device being an eighth exemplary embodiment of the present invention is embedded. A state is shown FIG. 33 in which a lid of the display device 26 is opened and its inside portion can be seen. The display device 26, as shown in FIG. 33, is configured so that its main body 27 and its lid portion 28 have a heart-like shape and, at a bottom of the main body 27, the heart-shaped display device 29 is housed and, when the lid portion 28 is opened, the display device 29 appears. Thus, by applying the display device 29 of the eighth exemplary embodiment to such decorative devices as a decorative ornament, decorative container for women (for example, a compact for make-up, accessory box, or the like), outfitting (for example, a pendant which hangs from a piece of jewelry, and the like), their functions and attractive appearance can be improved. Moreover, the heart-shaped display device may be mounted not on the main body side but on the lid portion side. The heart-shaped display device may be mounted on both the main body side and lid portion side. By mounting the heart-shaped display device which functions as a toilet mirror when an image is not being displayed, the function and attractive appearance of the compact for making-up can be improved. Further, by driving the device of the kind according to a wireless signal transmitting method or wireless power supply method (as in the seventh exemplary embodiment), functional design and design freedom can be further improved.

Ninth Exemplary Embodiment

Figure 34A:
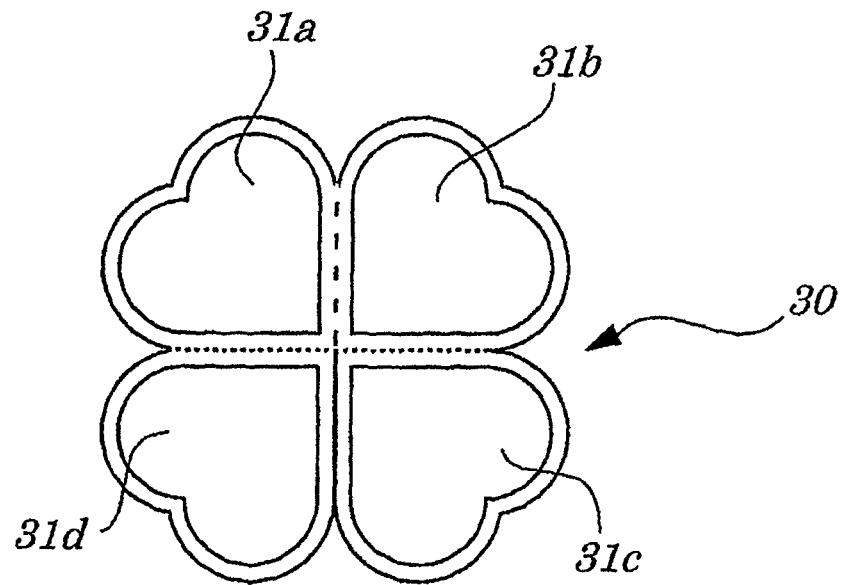
FIGS. 34A and 34B are a perspective view showing an appearance of a decorative device in which a non-rectangular display device being a ninth exemplary embodiment of the present invention is embedded.
Figure 34B:
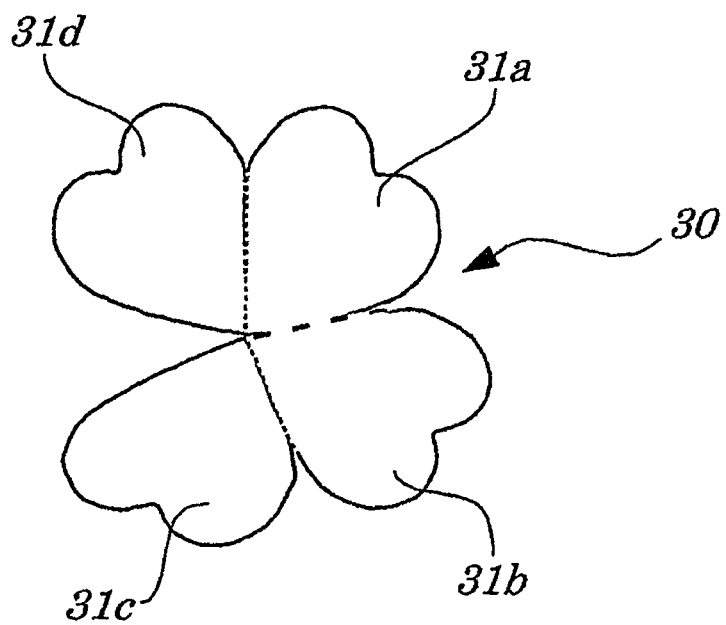

FIGS. 34A and 34B are a perspective view showing an appearance of a decorative device in which a non-rectangular display device being a ninth exemplary embodiment of the present invention is embedded. FIG. 34A shows a state in which the decorative non-rectangular display device 30 is opened and FIG. 34B shows a state in which the decorative non-rectangular display device 30 is folded three-dimensionally. In the decorative non-rectangular device 30, as shown in 34A and 34B, four heart-shaped portions 31a, 31b, 31c, and 31d making up the non-rectangular display device 30 are embedded. When the decorative device is opened, as shown in 34A, a state occurs in which a four-leaf clover is seen. Each of the four heart-shaped portions 31a, 31b, 31c, and 32d makes up each leaf of the four-leaf clover. A different image may be displayed independently in each of the four heart-shaped portions 31a, 31b, 31c, and 31d or each of images obtained by dividing one image into four images may be displayed in each of the heart-shaped portions 31a, 31b, 31c, and 31d. In the non-rectangular display device of the ninth exemplary embodiment, three portions making up the display device 30 shown by a dotted line or broken line extending from a center of the display device shown in FIG. 34A are binding regions used to bind the heart-shaped portions (31d and 31a, 31a and 31b, and 31b and 31c) adjacent to one another in the right and left directions or up and down directions so that the display device 30 can be freely folded by being mounted on a flexible substrate or the like at the binding regions. Moreover, portions shown by a solid line positioned in the lower direction of FIGS. 34A and 34B are breaks and the right and left heart-shaped portions (31c and 31d) of the display device 30 are not bound to each other. The portions of the display device 30 positioned in an upper portion of FIG. 34A can be folded, at the dotted line portion, in a rear direction in a mountain-folded manner. The portions of the display device 30 directed to right and left directions can be folded, at the broken line portion, in a valley-folded manner so that surfaces of right and left portions of the display device 30 overlap each other. When all portions of the display device 30 are folded, the shape of the display device 30 changes from a clover-like shape to a heart-like shape. When the shape is changed to the heart-like shape, a state occurs in which two portions of the display device 30 out of the four portions of the display devices 31a, 31b, 31c, and 31d can be seen. When a pendant or the like is formed in the state in which the display device 30 has a heart-like shape, the shape of the display device 30 can be changed to be clover-like or to be three-dimensionally intermediate, if necessary, which can provide an extremely effective design result. Further, by driving the display device of this kind according to the wireless transmission method or wireless power supply method (as in the seventh exemplary embodiment), there is no need for taking wired connection into consideration, functional design and design freedom can be further improved.

Tenth Exemplary Embodiment

Figure 37:
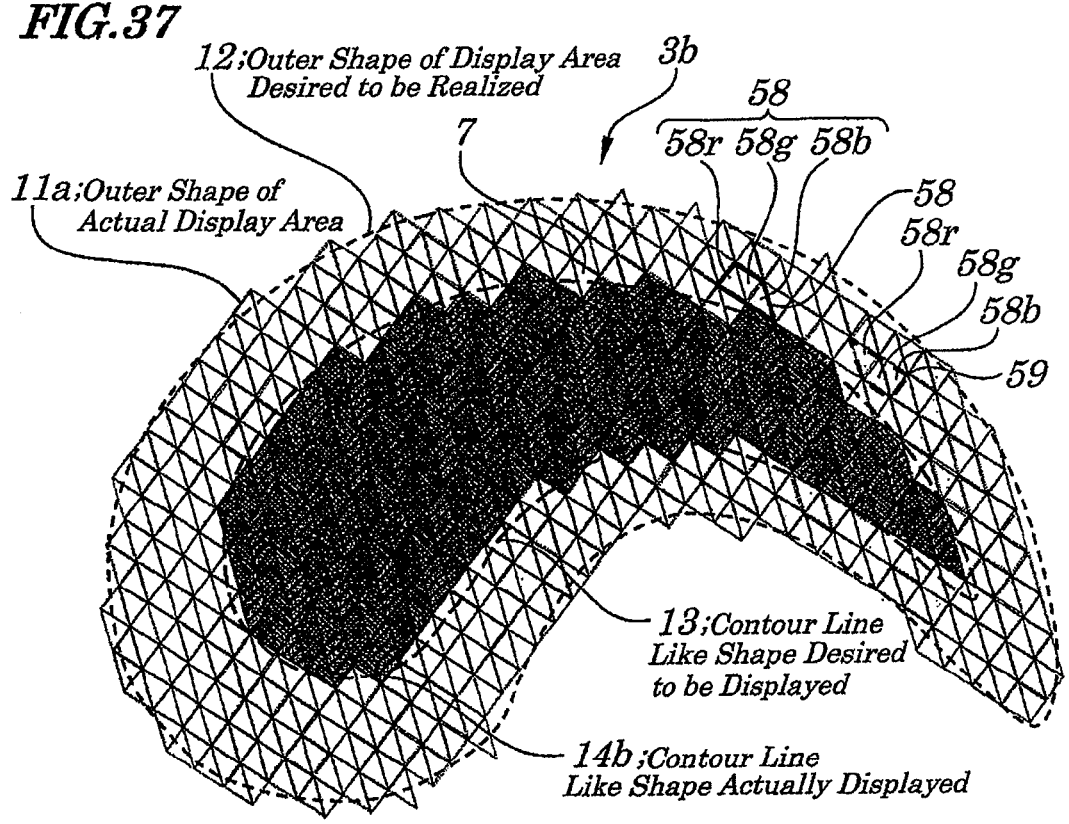
FIG. 37 is a diagram diagrammatically showing an arrangement of color pixels in a display area making up a non-rectangular color display device according to a tenth exemplary embodiment of the present invention.

Next, a tenth exemplary embodiment is described by referring to FIG. 37. FIG. 37 is a diagram diagrammatically showing an arrangement of color pixels in a display area making up a non-rectangular color display device according to the tenth exemplary embodiment of the present invention. FIGS. 38 to 42 are diagrams showing, in a simplified manner, some arrangements of color pixels in the display area of FIG. 37. In the color pixel arrays of the tenth exemplary embodiment, each of a plurality of non-rectangular pixels described in the above first to ninth exemplary embodiments has a color out of a plurality of specified colors (for example, red, green, and blue) for color display and the non-rectangular unit pixel for the color display is formed by a combination of a plurality of color pixels. According to the tenth exemplary embodiment, color pixels can be arranged in a given manner by the non-rectangular pixel with color pixels, however, to realize further higher display quality, the number of same color pixels adjacent, in a line-like manner, to each color pixel are preferably set to be "1" or "0". Hereinafter, by referring to FIGS. 37 to 42, a method of a typical arrangement of pixels is described. Moreover, various wirings are approximately the same as those in the above first to ninth exemplary embodiments and their descriptions are omitted accordingly.

In FIG. 37, a display area (non-rectangular pixel array) 3b configured by using the same pixel arrangement as employed in the first exemplary embodiment (FIG. 6) is shown in which each of triangular pixels (non-rectangular pixels) 7, 7, . . . , is used respectively as a red pixel 58r, green pixel 58g, or blue pixel 58b, . . . and each of unit pixels 58 and 59 for color display is constructed of one combination of these color pixels. In the pixel arrangement configuration of the display area 3*b*, as shown in FIG. 37, the number of same color pixels adjacent, in a line-like manner, to each of the triangular color pixels is set to be "1" and each of the triangular color pixels 58*r*, 58*g*, and 58*b* is arranged in a state in which these color pixels 58*r*, 58*g*, and 58*b* are adjacent to one another with one side of the triangle making up the pixel being shared with the same color pixel. That is, one combination of the unit pixel is constructed of the two same color pixels 58*r* and 58*r*, 58*g* and 58*g*, and 58*b* and 58*b*, with one side of the triangle making up the pixel being shared with the same color pixels.

Here, the display area 3*b* is made up of two kinds of unit pixels 58 and 59 being not similar to each other which includes pixels providing color information and is filled up with the unit pixels entirely. That is, in the case of such unit pixels 58 and 59 as described above, color pixels adjacent to one another are arranged so as to form translational symmetric structure in which no overlap occurs. Owing to this, even if there is inclination in a specific direction in an outer circumferential portion of the display shape, no successive same colors appear. For example, when a pixel is seen from one wiring direction out of the three wiring directions, the pixel having the same color and similarity always occurs in every two colors or every three colors. Due to this, the presumed three colors are mixed at all times, which can prevent a specified color from being conspicuous. That is, color bleeding can be reduced.

Figure 38:
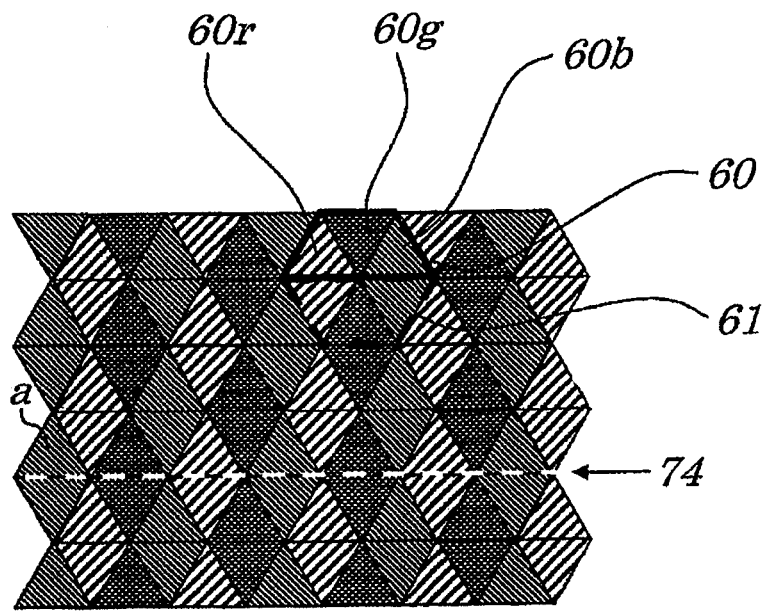
FIG. 38 is a diagram showing, in a simplified manner, some arrangements of color pixels in the display area of FIG. 37.

FIG. 38 shows an example of a color pixel arrangement of three colors and simplified color pixel arrangements corresponding to the arrangements in FIG. 37. In this pixel arrangement, a red pixel 60*r*, green pixel 60*g*, and blue pixel 60*b* make up the unit pixels 60 and 61 being not similar to each other. Each of the unit pixels 60 and 61 has one of pixels having the same color being adjacent to each other with one side of a triangle making up the pixel being shared with each other. When a color pixel a side of a pixel triangle of which is adjacent to a side on an upper side of the broken line (wiring) in FIG. 38 is noted, a blue pixel 60*b* being similar to a pixel "a" existing on a left side and to the described blue pixel 60*b* and being adjacent to the broken line (wiring) 74 occurs in every three color pixels. According to this configuration, a repetition pitch of the pixel having a similar shape and same color is large and, therefore, even when a color pixel out of the unit pixels 60 and 61 is not partially used according to a display shape or outer circumferential shape, a specified color is not displayed in a conspicuous manner.

Figure 39:
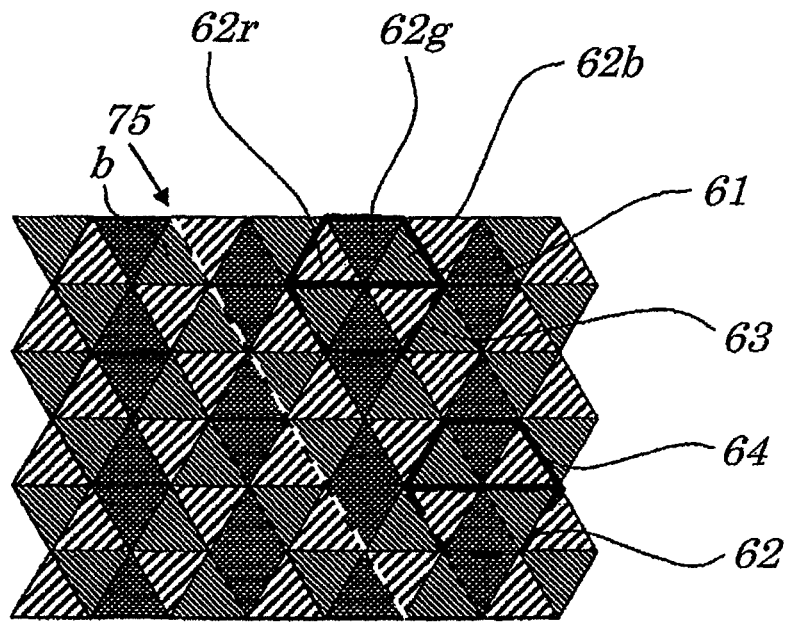
FIG. 39 is a diagram showing, in a simplified manner, some arrangements of color pixels in the display area of FIG. 37.

FIG. 39 shows an example of another arrangement of color pixels 62*r*, 62*g*, and 62*b* according to the tenth exemplary embodiment. In the arrangement configuration, there are four kinds of patterns for a unit pixel. The unit pixels 62 and 64 are similar to each other not only in size but also in color and are overlapped when rotated at 180 degrees. Also, the unit pixels 65 and 63 are similar to each other not only in size but also in color and are overlapped when rotated at 180 degrees. On the other hand, the unit pixels 62 and 65 are not similar to each other in color. In the arrangement configuration, unlike in the case of FIG. 38, the color pixels one of sides of the pixel triangle of which is shared with each other and having the same color are the pixel having a specific one color only, that is, in the exemplary embodiment, the green pixels 62*g* and 62*g* only. When the broken line (wiring) 75 in FIG. 39 is noted, the color pixel one side of a pixel triangle of which is shared with other pixel and being in contact with a lower side of the broken line is the blue pixel 62*b* having the same color as the pixel "b" in FIG. 39 which is shifted with one pitch from the pixel "b" and from the blue pixel 62*b* described above. The pixel 62*b* appears next in a position shifted by 6 pixels from the pixel "b" in FIG. 39. That is, unlike in the case of FIG. 38 in which there is only one repetition pitch, in the case of FIG. 39, there are two repetition pitches. In the arrangement configuration shown in FIG. 39, pixels having the same color and adjacent to each other with one side of a pixel triangle being shared with each other is limited to the pixels having a specific one color (in the exemplary embodiment, green pixels 62*g* and 62*g*) and, on the other hand, the shift pitch between pixels arranged in a translational direction with one side of the pixel triangle being not shared with each other takes various values. The irregular color caused by adjacent pixels sharing a non-similar side with each other and having the same color is more reduced, while irregular color caused by pixels having near pitch and same color further increases when compared with the case of FIG. 38. However, display characteristics are extremely improved compared with the conventional technologies.

Figure 40:
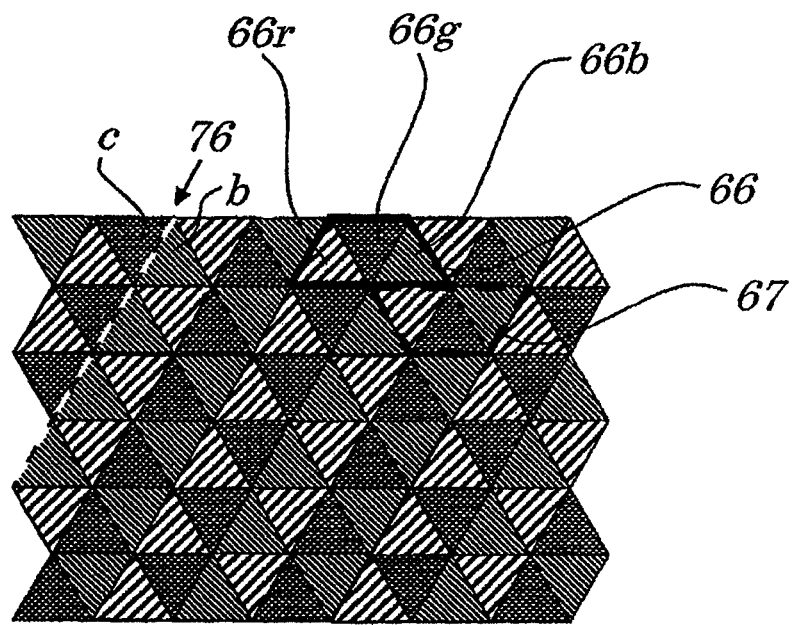
FIG. 40 is a diagram partially showing, in a simplified manner, some arrangements of color pixels in the display area of FIG. 37.

FIG. 40 shows an example of still another arrangement configuration of a color pixel of the tenth exemplary embodiment. In the arrangement configuration, as in the case of FIG. 38, two kinds of unit pixels being different from each other in color and shape are shown. Unlike in the case of the arrangement configuration in FIG. 38 in which two kinds of unit pixels 61 and 62 are arranged so as to completely overlay sides of the trapezoid forming the unit pixel, in the case of FIG. 40, sides of the trapezoid of the unit pixels 66 and 67 are not overlaid with each other and a pitch of a color pixel is shifted by one pixel pitch. As a result, the number of color pixels having the same color adjacent, in a line-like manner, to color pixels 66*r*, 66*g*, and 66*b* is set to be "0" and the side of the triangle forming the pixel is not shared. On the other hand, when the broken line (wiring) 76 is noted, the color pixels (for example, "b" and "c") sharing a side of a pixel triangle with the broken line (wiring) 76 are arranged in a repeated manner in every pixel in a direction of the broken line (wiring) 76. Owing to this, the irregular color caused by adjacent pixels sharing a non-similar side with each other and having the same color disappears, while irregular color caused by pixels having near pitch and same color further increases. However, display characteristics are extremely improved compared with the conventional technologies.

Figure 41:
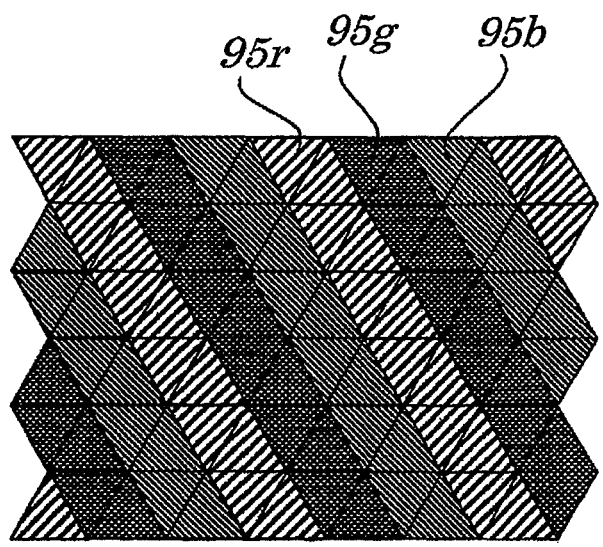
FIG. 41 is a diagram partially showing, in a simplified manner, some arrangements of color pixels in the display area of FIG. 37.

Next, an example is shown in FIG. 41 which there exist two or more adjacent pixels 95*r*, 95*g*, and 95*b* sharing a side of a pixel triangle with each other. In the example, the color pixels are arranged in a slanted strap form. Due to this, irregular colors occur remarkably in a specific direction. However, jaggies are reduced compared with the conventional technology.

Figure 42:
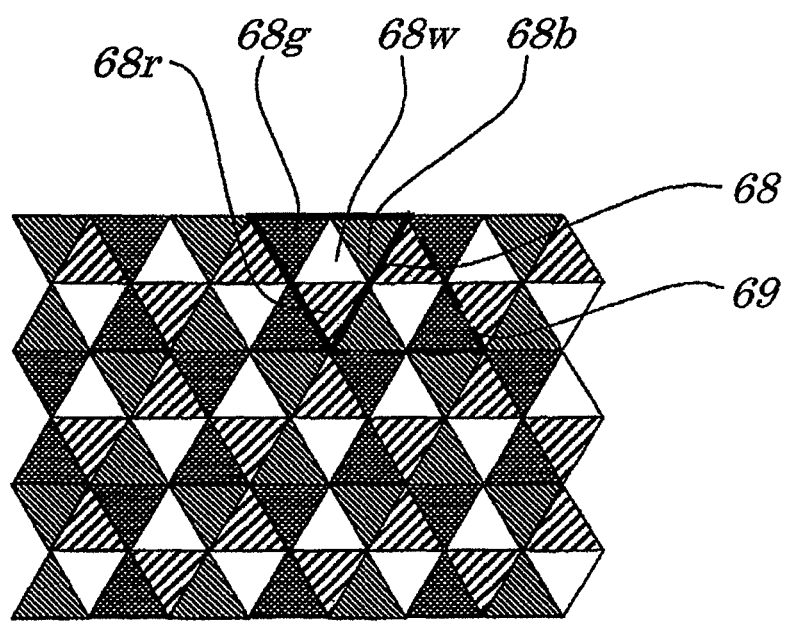
FIG. 42 is a diagram partially showing, in a simplified manner, some arrangements of color pixels in the display area of FIG. 37.

In the above exemplary embodiments, the case in which the number of colors of the color pixel is mainly explained, however, the number of colors is not limited to three and any number is acceptable so long as the number is plural. In FIG. 42, the example of the arrangement using color pixels having four colors is shown. In the example, besides the red pixel 68*r*, green pixel 68*g*, and blue pixel 68*b*, a white pixel 68*w* is added. Here, there are two patterns of the unit pixels 68 and 69. In the example, the unit pixel 68 and 69 have overlap similarity to each other by rotational operation. In this arrangement configuration, color pixels having the same color are not adjacent and share one side of a pixel triangle. Further, color pixels having the same color existing with one side of a pixel triangle contacted with one side portion of a wiring appears in every two pixels. Owing to this, the irregular color caused by a specified color is unlikely to occur. In the exemplary embodiment, the pixel is non-rectangular, however, its shape is not limited to this and the pixel may be hexagonal, parallelogrammic or the like.

Eleventh Exemplary Embodiment

Figure 43:
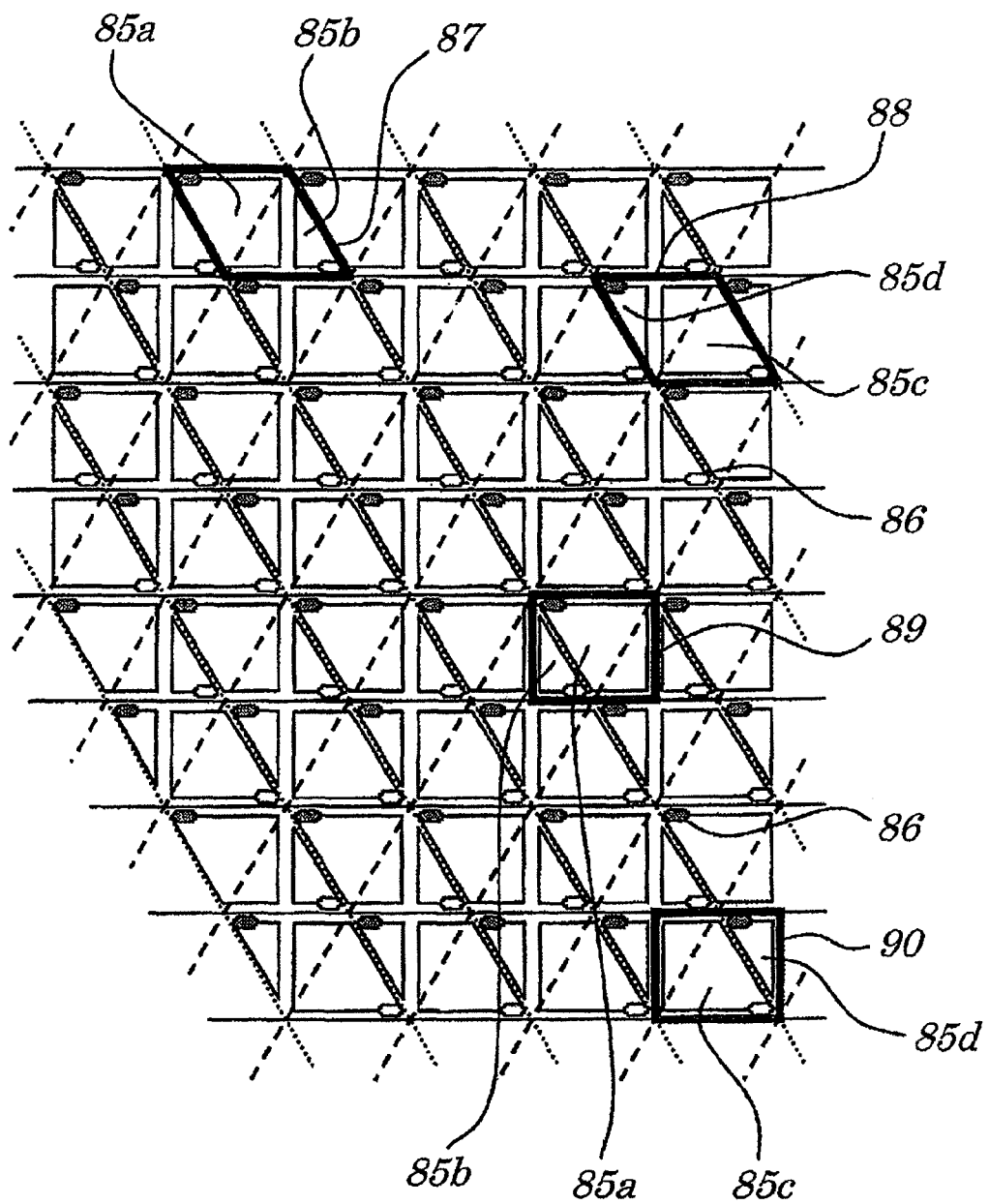
FIG. 43 is a diagram partially showing an arrangement configuration of a pixel array according to an eleventh exemplary embodiment of the present invention.
Figure 44:
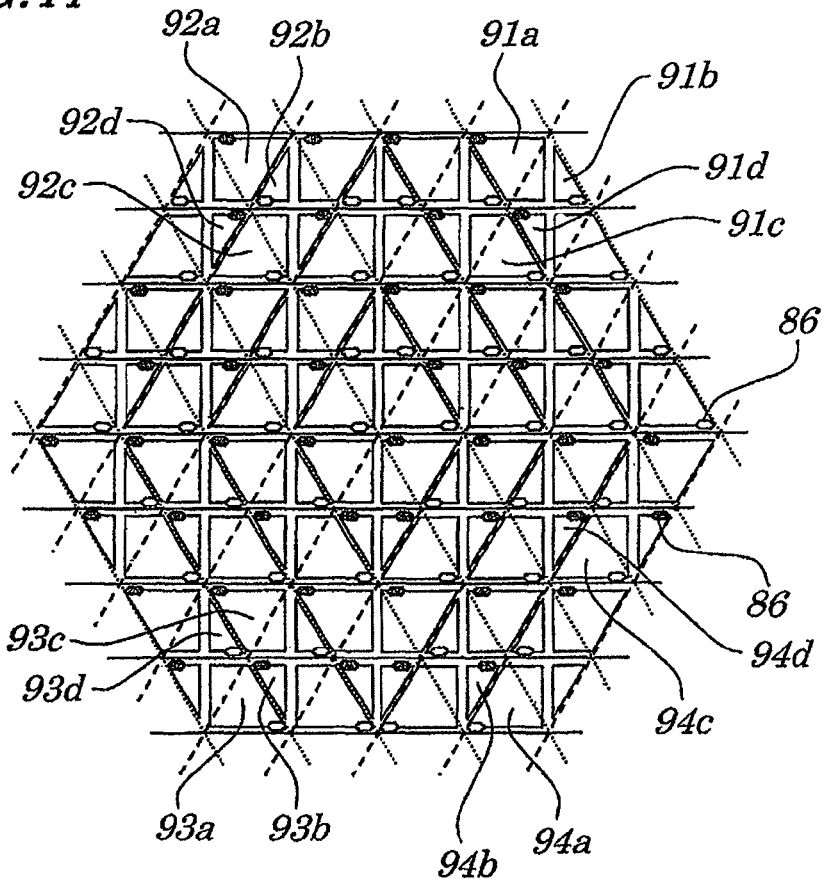
FIG. 44 is a diagram partially showing another arrangement configuration of the pixel array of FIG. 43.
Figure 45:
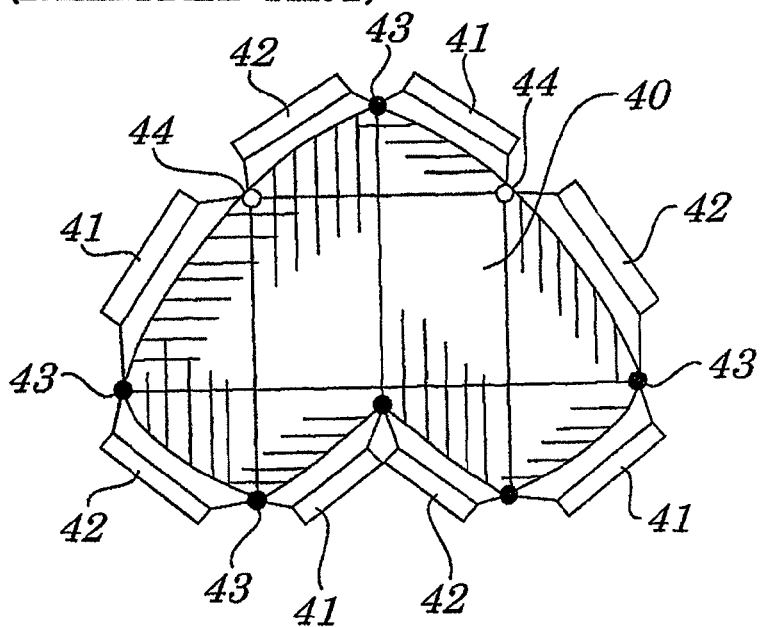
FIG. 45 is a diagram showing diagrammatically a configuration of a related art display device.
Figure 46:
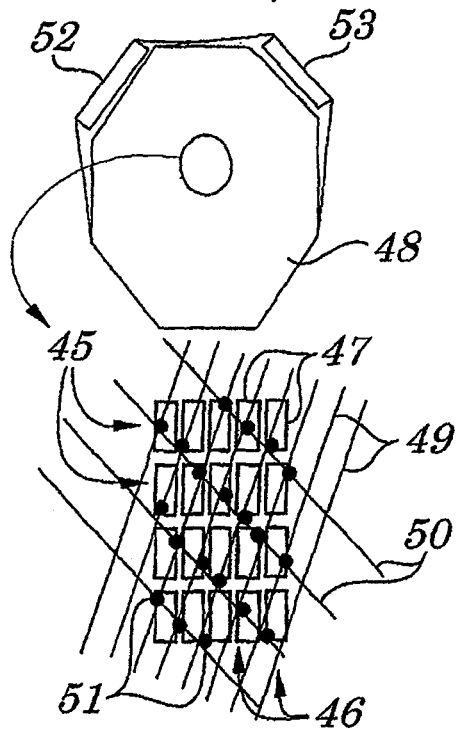
FIG. 46 is also a diagram showing diagrammatically a configuration of a related art display device.

Next, an eleventh exemplary embodiment of the present invention is described by referring to FIGS. 43 and 44. FIG. 43 is a diagram partially showing an arrangement configuration of a pixel array according to the eleventh exemplary embodiment of the present invention. FIG. 44 is a diagram partially showing another arrangement configuration of the pixel array of FIG. 43. The pixel array of the eleventh exemplary embodiment, as shown in FIGS. 43 and 44, four kinds of non-rectangular sub-pixels 85*a*, 85*b*, 85*c*, and 85*d* exist. The sub-pixels 85*a* and 85*c*, and sub-pixels 85*b* and 85*d* are similar to one another since these sub-pixels overlap by being rotated. Each of the sub-pixels 85*a*, 85*b*, 85*c*, and 85*d* has an active element 86. By changing the combination of the sub-pixels by driving the active element 86 according to display contents, desired pixel configuration, that is, rectangular or non-rectangular pixel configuration can be selected alternatively. For example, for character display, a rectangular pixel configuration is selected and, for graphical display, non-rectangular pixel configuration is selected.

The configuration is described in detail by referring to FIG. 43. By the combination of a trapezoidal sub-pixel 85*a* and a triangular sub-pixel 85*b* making up a right side portion of the sub-pixel 85*a* in FIG. 43, the non-rectangular pixel 87 (in the example, parallelogrammic pixel) is formed. Similarly, by the combination of a trapezoidal sub-pixel 85*c* and a triangular sub-pixel 85*d* making up a left side portion of the sub-pixel 85*c* in FIG. 43, a non-rectangular pixel 88 (in the example, parallelogrammic pixel) is formed. Using these pixels 87 and 88, non-rectangular pixels can be suitably displayed. Also, by the combination of a trapezoidal sub-pixel 85*a* and a triangular sub-pixel 85*b* making up a left side portion of the sub-pixel 85*a* in FIG. 43, a non-rectangular pixel 89 is formed. By the combination of the pixel 85*a* and pixel 85*b*, the rectangular pixel 89 is formed. By the combination of a trapezoidal sub-pixel 85*c* and a triangular sub-pixel 85*d* making up a right side portion of the sub-pixel 85*c* in FIG. 43, the rectangular pixel 90 is formed. By combining these pixels 89 and 90, rectangular pixel display at the time of character display can be suitably realized. This substitution of pixels can be realized by electrically changing a signal to be applied to the active element 86 and wirings and the change of the arrangement of pixels itself is not required. Therefore, the display method can be properly selected according to contents.

FIG. 44 shows another arrangement configuration of the pixel array of FIG. 43. The patterns of the arrangement of pixels are different in every quadrant mainly in the center of FIG. 44. The arrangement of sub-pixels 91*a*, 91*b*, 91*c*, 91*d*, 92*a*, 92*b*, 92*c*, 92*d*, 93*a*, 93*b*, 93*c*, 93*d*, 94*a*, 94*b*, 94*c*, and 94*d*, except the arrangement of the active element 86 and various wirings, can be obtained by folding all pixels over at a center of FIG. 44 in vertical and horizontal directions. By configuring the pixels as above, in the non-rectangular display, suitable inclination appears in each of four quadrants and, therefore, when the non-rectangular pixel having a comparatively symmetric shape such as a hexagon is to be displayed, jaggies in an outer shape can be eliminated. Moreover, as in the case of FIG. 43, when characters are to be displayed, rectangular pixels can be used for displaying.

While the invention has been particularly shown and described with reference to exemplary embodiments thereof, the invention is not limited to these exemplary embodiments. It will be understood by those of ordinary skill in the art that various changes in form and details may be made therein without departing from the sprit and scope of the present invention as defined by the claims. For example, in each of the exemplary embodiments and examples, the first, second, and third conductor lines are mounted on the same substrate, however, depending on kinds of the display devices, the first and second conductor lines may be mounted on a first substrate and the third conductor line may be mounted on a second substrate. Further, in each of the exemplary embodiments and examples, the first, second, third conductor lines are mounted on the same substrate, however, the use of the third conductor line may be discontinued and a virtual line may be used or the third conductor line may be used as an auxiliary conductor line or as a conductor line in a state of being suspended.

The present invention can be applied to portable devices and decorative illumination devices.

What is claimed is:

1. A non-rectangular pixel array with a non-rectangular shaped outer circumference comprising:
    non-rectangular pixels including first pixels and second pixels;
    first conductor line groups comprising first conductor lines;
    second conductor lines;
    third virtual lines, said first conductor line groups, said second conductor lines and said third virtual lines arranged to intersect with one another;
    first regions between adjacent first conductor lines arranged in parallel at relatively close range, without pixel existing in said first regions; and
    second regions between adjacent first conductor line groups arranged in parallel at relatively long range, with pixels existing in said second regions, said first regions and said second regions being alternately arranged,
    wherein, in said second regions, each of said first pixels is arranged to be surrounded by one of said adjacent first conductor lines of a corresponding first conductor line group, one second conductor line of the second conductor lines and one third virtual line of said third virtual lines, and
    each of said second pixels is arranged to be surrounded by another one of said adjacent first conductor lines of the corresponding first conductor line group, the one second conductor line, and said one third virtual line.

2. The non-rectangular pixel array according to claim 1, wherein, in said second regions, each of said first pixels is provided with a first active element which is connected to the another one of said adjacent first conductor lines and said one second conductor line, and
    each of said second pixels is provided with a second active element which is connected to the anther one of said adjacent first conductor lines and said one second conductor line.

3. The non-rectangular pixel array according to claim 1, wherein each of said first conductor lines serves as a gate line, and
    each of said second conductor lines serves as a data line.

4. The non-rectangular pixel array according to claim 1, wherein each of said non-rectangular pixels has independent translation relative to at least three different axes parallel to said first conductor lines, said second conductor lines, or said virtual lines.

5. The non-rectangular pixel array according to claim 1, wherein each of said non-rectangular pixels forms a color pixel with any one of colors out of a plurality of specified colors for color display and a unit pixel for said color display is constructed by a combination of the color pixels emitting the plurality of colors.

6. The non-rectangular pixel array according to claim 5, wherein said color pixels emitting said plurality of colors are arranged in a state in which each of said plurality of color pixels is adjacent, in a line-like manner, to at most one other color pixel having a same color.

7. A display device comprising a non-rectangular pixel array as set forth in claim 1, wherein an outer shape thereof is approximately geometrically similar to the outer circumferential shape of said non-rectangular pixel array.

8. The display device according to claim 7, wherein a peripheral circuit to drive each of said conductor lines is mounted along the outer circumference of said pixel array outside said pixel array.

9. A non-rectangular pixel array comprising:
a non-display portion with no pixels and with a non-rectangular contour shape formed inside of said non-rectangular pixel array;
non-rectangular pixels including first pixels and second pixels;
first conductor line groups comprising first conductor lines;
second conductor lines;
third virtual lines, said first conductor line groups, said second conductor lines and said third virtual lines arranged to intersect with one another;
first regions between adjacent first conductor lines arranged in parallel at relatively close range, without pixel existing in said first regions; and
second regions between adjacent first conductor line groups arranged in parallel at relatively long range, with pixels existing in said second regions, said first regions and said second regions being alternately arranged,
wherein, in said second regions, each of said first pixels is arranged to be surrounded by one of said adjacent first conductor lines of a corresponding first conductor line group, one second conductor line of the second conductor lines, and one third virtual line of said third virtual lines, and
each of said second pixels is arranged to be surrounded by another one of said adjacent first conductor lines of the corresponding first conductor line group, the one second conductor line, and said one third virtual line.

10. The non-rectangular pixel array according to claim 9, wherein, in said second regions, each of said first pixels is provided with a first active element which is connected to the one of said adjacent first conductor lines and said one second conductor line, and
each of said second pixels is provided with a second active element which is connected to the another one of said adjacent first conductor lines and said one second conductor line.

11. The non-rectangular pixel array according to claim 9, wherein each of said first conductor lines serves as a gate line, and
each of said second conductor lines serves as a data line.

12. The non-rectangular pixel array according to claim 9, wherein each of said non-rectangular pixels has independent translation relative to at least three different axes parallel to said first conductor lines, said second conductor lines, or said virtual lines.

13. The non-rectangular pixel array according to claim 9, wherein each of said non-rectangular pixels forms a color pixel with any one of colors out of a plurality of specified colors for color display and a unit pixel for said color display is constructed by a combination of the color pixels emitting the plurality of colors.

14. The non-rectangular pixel array according to claim 13, wherein said color pixels emitting said plurality of colors are arranged in a state in which each of said plurality of color pixels is adjacent, in a line-like manner, to at most one other color pixel having a same color.

15. A display device comprising a non-rectangular pixel array as set forth in claim 9, wherein an outer shape thereof is approximately geometrically similar to the outer circumferential shape of said non-rectangular pixel array.

16. The display device according to claim 15, wherein a peripheral circuit to drive each of said conductor lines is mounted along the outer circumference of said pixel array outside said pixel array.

17. A non-rectangular pixel array with a non-rectangular shaped outer circumference comprising:
non-rectangular pixels including first pixels and second pixels;
first conductor line groups comprising first conductor lines;
second conductor lines;
third conductor lines, said first conductor line groups, said second conductor lines and said third conductor lines arranged to intersect with one another;
first regions between adjacent first conductor lines arranged in parallel at relatively close range, without pixel existing in said first regions; and
second regions between adjacent first conductor line groups arranged in parallel at relatively long range, with pixels existing in said second regions, said first regions and said second regions being alternately arranged,
wherein, in said second regions, each of said first pixels is arranged to be surrounded by one of said adjacent first conductor lines of a corresponding first conductor line group, one second conductor line of the second conductor lines, and one third conductor line of the third conductor lines, and
each of said second pixels is arranged to be surrounded by another one of said adjacent first conductor lines of the corresponding first conductor line group, the one second conductor line, and the one third conductor line.

18. The non-rectangular pixel array according to claim 17, wherein, in said second regions, each of the first pixels is provided with a first active element which is connected to the one of the adjacent first conductor lines and the one second conductor line, and
each of the second pixels is provided with a second active element which is connected to the another one of the adjacent first conductor lines and the one second conductor line.

19. The non-rectangular pixel array according to claim 17, wherein each of the first conductor lines serves as a gate line, and
each of the second conductor lines serves as a data line.

20. The non-rectangular pixel array according to claim 17, wherein each of said third conductor lines is a storage capacitance line.

21. The non-rectangular pixel array according to claim 17, wherein, in said second regions, each of the first pixels is provided with a first active element which is connected to the one of said adjacent first conductor lines and said one second conductor line, and
each of said second pixels is provided with a second active element which is connected to the another one of said adjacent first conductor lines and said one third conductor line.

22. The non-rectangular array according to claim 17, wherein each of said non-rectangular pixels has independent translation relative to two or three different axes parallel to said first conductor lines, said second conductor lines, or said third conductor lines.

23. The non-rectangular array according to claim 17, wherein each of said non-rectangular pixels comprises an approximately triangular pixel and is surrounded by said first conductor lines, said second conductor lines, and said third conductor lines.

24. The non-rectangular array according to claim 17, wherein each of said non-rectangular pixels comprises an approximately parallelogrammic pixel and is surrounded by said first conductor lines and said second conductor lines.

25. The non-rectangular pixel array according to claim 17, wherein each of said non-rectangular pixels forms a color pixel with any one of colors out of a plurality of specified colors for color display and a unit pixel for said color display is constructed by a combination of said color pixel emitting the plurality of colors.

26. The non-rectangular pixel array according to claim 25, wherein said color pixels emitting said plurality of colors are arranged in a state in which each of said plurality of color pixels is adjacent, in a line-like manner, to at most one other color pixel having a same color.

27. A display device comprising a non-rectangular pixel array as set forth in claim 17, wherein an outer shape thereof is approximately geometrically similar to the outer circumferential shape of said non-rectangular pixel array.

28. The display device according to claim 27, wherein a peripheral circuit to drive each of said conductor lines is mounted along the outer circumference of said pixel array outside said pixel array.

29. A non-rectangular pixel array comprising:
a non-display portion with no pixels and with a non-rectangular contour shape formed inside of said non-rectangular pixel array; and
non-rectangular pixels including first pixels and second pixels;
first conductor line groups comprising first conductor lines;
second conductor lines;
third conductor lines, said first conductor line groups, said second conductor lines and said third conductor lines arranged to intersect with one another;
first regions between adjacent first conductor lines arranged in parallel at relatively close range, without pixel existing in said first regions; and
second regions between adjacent first conductor line groups arranged in parallel at relatively long range, with pixels existing in said second regions, said first regions and said second regions being alternately arranged,
wherein, in said second regions, each of said first pixels is arranged to be surrounded by one of said adjacent first conductor lines of a corresponding first conductor line group, one second conductor line of the second conductor lines, and one third conductor line of said third conductor lines, and
each of said second pixels is arranged to be surrounded by another one of said adjacent first conductor lines of the corresponding first conductor line group, the one second conductor line, and said one third conductor line.

30. The non-rectangular pixel array according to claim 29, wherein, in said second regions, each of said first pixels is provided with a first active element which is connected to the one of said adjacent first conductor lines and said one second conductor line, and
each of said second pixels is provided with a second active element which is connected to the another one of said adjacent first conductor lines and said one second conductor line.

31. The non-rectangular pixel array according to claim 29, wherein each of said first conductor lines serves as a gate line, and
each of said second conductor lines serves as a data line.

32. The non-rectangular pixel array according to claim 29, wherein each of said third conductor lines is a storage capacitance line.

33. The non-rectangular pixel array according to claim 29, wherein, in said second regions, each of said first pixels is provided with a first active element which is connected to the one of said adjacent first conductor lines and said one second conductor line, and
each of said second pixels is provided with a second active element which is connected to the another one of said adjacent first conductor lines and said one third conductor line.

34. The non-rectangular pixel array according to claim 29, wherein each of said non-rectangular pixels has independent translation relative to two or three different axes parallel to said first conductor lines, said second conductor lines, or said third conductor lines.

35. The non-rectangular pixel array according to claim 29, wherein each of said non-rectangular pixels comprises an approximately triangular pixel and is surrounded by said first conductor lines, said second conductor lines, and said third conductor lines.

36. The non-rectangular pixel array according to claim 29, wherein each of said non-rectangular pixels comprises an approximately parallelogrammic pixel and is surrounded by said first conductor lines and said second conductor lines.

37. The non-rectangular pixel array according to claim 29, wherein each of said non-rectangular pixels forms a color pixel with any one of colors out of a plurality of specified colors for color display and a unit pixel for said color display is constructed by a combination of said color pixel emitting the plurality of colors.

38. The non-rectangular pixel array according to claim 37, wherein said color pixels emitting said plurality of colors are arranged in a state in which each of said plurality of color pixels is adjacent, in a line-like manner, to at most one other color pixel having a same color.

39. A display device comprising a non-rectangular pixel array as set forth in claim 29, wherein an outer shape thereof is approximately geometrically similar to the outer circumferential shape of said non-rectangular pixel array.

40. The display device according to claim 39, wherein a peripheral circuit to drive each of said conductor lines is mounted along the outer circumference of said pixel array outside said pixel array.

* * * * *